United States Patent
Schmidt et al.

(10) Patent No.: US 9,185,560 B2
(45) Date of Patent: *Nov. 10, 2015

(54) IDENTITY MANAGEMENT ON A WIRELESS DEVICE

(71) Applicant: InterDigital Patent Holdings, Inc., Wilmington, DE (US)

(72) Inventors: Andreas U. Schmidt, Frankfurt am Main (DE); Michael V. Meyerstein, Martlesham Heath (GB); Andreas Leicher, Frankfurt (DE); Yogendra C. Shah, Exton, PA (US); Louis J. Guccione, East Chester, NY (US); Inhyok Cha, Gangnam-Ku (KR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,226

(22) Filed: Nov. 10, 2014

(65) Prior Publication Data

US 2015/0065093 A1  Mar. 5, 2015

Related U.S. Application Data

(60) Continuation of application No. 13/964,751, filed on Aug. 12, 2013, now Pat. No. 8,886,948, which is a division of application No. 13/237,344, filed on Sep. 20, 2011, now Pat. No. 8,509,431.

(60) Provisional application No. 61/403,729, filed on Sep. 20, 2010, provisional application No. 61/428,388, filed on Dec. 30, 2010.

(51) Int. Cl.
*H04L 9/00* (2006.01)
*H04W 12/06* (2009.01)
(Continued)

(52) U.S. Cl.
CPC ............ *H04W 12/06* (2013.01); *H04L 63/061* (2013.01); *H04L 63/08* (2013.01);
(Continued)

(58) Field of Classification Search
None
See application file for complete search history.

(56) References Cited

U.S. PATENT DOCUMENTS 8,341,416 B2 * 12/2012 Camenisch et al. .......... 713/180
2011/0179270 A1 * 7/2011 Tewari et al. ................. 713/165
(Continued)

FOREIGN PATENT DOCUMENTS

WO  WO 2008/024454  2/2008
WO  WO 2011/100331  8/2011

OTHER PUBLICATIONS

Watanabe et al., Federated Authentication Mechanism using Cellular Phone—Collaboration with OpenID, IEEE, 2009.*
(Continued)

*Primary Examiner* — Minh Dinh
(74) *Attorney, Agent, or Firm* — Baker & Hostetler LLP

(57) ABSTRACT

A wireless device may perform a local authentication to reduce the traffic on a network. The local authentication may be performed using a local web server and/or a local OpenID provider (OP) associated with the wireless device. The local web server and/or local OP may be implemented on a security module, such as a smartcard or a trusted execution environment for example. The local OP and/or local web server may be used to implement a provisioning phase to derive a session key, associated with a service provider, from an authentication between the wireless device and the network. The session key may be reusable for subsequent local authentications to locally authenticate a user of the wireless device to the service provider.

19 Claims, 25 Drawing Sheets

(51) Int. Cl.
H04L 29/06 (2006.01)
H04W 12/04 (2009.01)
H04L 29/08 (2006.01)
H04W 88/02 (2009.01)

(52) U.S. Cl.
CPC ....... *H04L 63/0815* (2013.01); *H04L 63/0853* (2013.01); *H04L 67/02* (2013.01); *H04W 12/04* (2013.01); *H04L 63/068* (2013.01); *H04L 2463/061* (2013.01); *H04L 2463/081* (2013.01); *H04W 88/02* (2013.01)

(56) References Cited

U.S. PATENT DOCUMENTS

| | | | |
|---|---|---|---|
| 2011/0225637 A1* | 9/2011 | Counterman | 726/7 |
| 2011/0287739 A1* | 11/2011 | Cajigas Bringas et al. | 455/410 |
| 2012/0072979 A1* | 3/2012 | Cha et al. | 726/7 |

OTHER PUBLICATIONS

OpeniD Authentication 2.0- Final, openid.net, 2007., 1-40 pages, http://openid.net/specs/openid-authentication-2_0.html.
"Disruptive Technologies Global Trends 2025 Background: The Internet of things", SRI Consulting Business Intelligence, Appendix F-1, Apr. 10, 2008, 19 pages.
"Shared Destinies—How the Internet of Things, Social Networks & Creative Collaboration Will Shape Future Market Structure", White Paper, Harbor Research, Inc., San Francisco, California, Jun. 2009, 19 pages.
3GPP TR 33.812 V9.2.0, "3rd Generation Partnership Project; Technical Specification Group Services and System Aspects; Feasibility study on the security aspects of remote provisioning and change of subscription for Machine to Machine (M2M) equipment (Release 9)", Jun. 2010, 1-87.
3GPP TR 33.820 V8.1.0, "3rd Generation Partnership Project; Technical Specification Group Service and System Aspects; Security of H(e)NB", (Release 8), Jun. 2009, 1-78.
3GPP TS 33.222 V9.1.0, "3'd Generation Partnership Project; Technical Specification Group Services and System Aspects; Generic Authentication Architecture (GAA); Access to Network Application Functions using Hypertext Transfer Protocol over Transport Layer Security", (Release 9), Jun. 2010, 22 pages.
3GPP TS 293.109 V9.2.0 TR, "Third Generation Partnership Project Technical Specification Group Core Network and Terminals; Generic Authentication Architecture (GAA); Zh and Zn Interfaces Based on the Diamter Protocol", (Release 9), Mar. 2010, 67 pages.
3GPP TR 33.924 V9.2.0, ,"3'd Generation Partnership Project; Technical Specification Group Services and System Aspects; Identity Management and Generic Authentication Architectre (GAA) Interworking", (Release 9), Jun. 2010, 39 pages.
3rd Generation Partnership Project (3GPP) TS 33.320, V9.4.0, "3rd Generation Partnership Project; Technical Specification Group Services and System Aspects; Security of a Home Node B (HNB) Home evolved Node B (HeNB)", (Release 9), Dec. 2010, 1-34.
3rd Generation Partnership Project (3GPP) TS 33.102 V9.2.0, "3rd Generatrion Partnership Project; Technical Specification Group Services and System Aspects; 3G Security; Security Architecture", (Release 9), Mar. 2010, 72 pages.
3rd Generation Partnership Project (3GPP) TS 33.220 V9.3.0, "3rd Generation Partnership Project; Technical Specification Group Services and System Aspects; Generic Authentication Architecture (GAA); Generic Bootstrapping Architecture", (Release 9), Jun. 2010, 75 pages.
TrustZone TM "ARM the Architecture for the Digital World", http://11 Nww.am.com/[2roducts/Processors/technologies/trustzone.PhP, accessed Dec. 28, 2010, 4 pages.
Azema et al., "M-Shield™ Mobile Security Technology: Making Wireless Secure", Texas Instruments White Paper, Feb. 2008, 6 pages.

BCC Research, "Safety and Security ID Technologies", http://www.bccresearch.com/re(2ort/SASO13A.html. Jun. 2005, accessed Dec. 28, 2010, 1 page.
Bellare et al., "Keying Hash Functions for Message Authentication", Advances in Cryptology—Crypto 96 Proceedings, Lecture Notes in Computer Science, Jun. 1996, 1109, 19 pages.
Bellare, "New Proofs for NMAC and HMAC: Security without Collision-Resistance", Advances in Cryptology—CRYPTO '06, Lecture Notes in Computer Sciences, Jun. 2006, 31 pages.
Canitrot, "SIMAlliance@SIMposium 2009", SIMAlliance, Vienna, Apr. 21-22, 2009, 40 pages.
European Telecommunications Standards Institute, ETSI TR 133 924 V9.1.0, "Digital Cellular Telecommunications System (Phase 2+); Universal Mobile Telecommunications System (UMTS); LTE; Identity Management and 3GPP Security Interworking; Identity Management and Generic Authentication Architecture (GAA) Interworking", 3GPP TR 33.924 V9.1.0 (Release 9), Apr. 2010, 29 pages.
European Telecommunications Standards Institute, ETSI TS 102 127, V6.13.0, "Smart Cards; Transport Protocol for CAT applications; Stape 2", (Release 6), Apr. 2009, 67 pages.
European Telecommunications Standards Institute, ETSI TS 102 483, V8.1.0, "Smart Cards; UICC-TerminalInterface; Internet Protocol connectivity between UICC and Terminal", (Release 8), Apr. 2009, 21 pages.
European Telecommunications Standards Institute, ETSI, TS 102 689, V1.1.1, "Machine-to-Machine communications (M2M); M2M Service Requirements", Aug. 2010, 34 pages.
European Telecommunications Standards Institute, ETSI, TS 102 691, V1.1.1, "Machine-to-Machine communications (M2M); Smart Metering use cases", May 2010, 49 pages.
Google Code, "Authentication and Authorization for Google APis: OAuth for Web Applications", httg://code.google.com/intl/de-DE/agis/accounts/docs/Auth.html, accessed Dec. 28, 2010, 7pages.
Google Code, "Federated Login for Google Account Users" http://code.google.com/intl/de- DE/apis/accounts/docs/OpeniD.html, accessed Dec. 28, 2010, 13 pages.
IBM, "IBM PCI Cryptographic Coprocessor: Notice of Withdrawal from Marketing", httg://www-03.ibm.com/security/qygtocards/gcicc/overview.shtml, accessed Jan. 17, 2011, 4 pages.
IDC, Inc. (Gantz—Project Director), "The Expanding Digital Universe. A Forecast of Worldwide Information Growth Through 2010", An IDC White Paper, Mar. 2007, 24 pages.
Jorstad et al., "Releasing the Portential of OpeniD and SIM", Intelligence in the Next Generation Networks, ICIN 2009, 13th International Conference on IEEE, Oct. 26, 2009, 6 pages.
Klenk et al., "Preventing Identity Theft with Electronic Identity Cards and the Trusted Platform Module", Proceedings of the Second European Workshop on System Security, Mar. 31, 2009,44-51.
Lamport, "Password Authentication With Insecure Communication", Communications of the ACM, Nov. 1981, 24(11), 770-772.
Lasica, "Identity in the Age of Cloud Computing: The next-generation Internet's impact on business, governance and social-interaction", 17th Annual Aspen Institute Roundtable on Information Technology, The Aspen Institute, Jul. 29-Aug. 1, 2008, 110 pages.
Leicher et al., "Trusted Computing Enhanced OpeniD", International Conference for Internet Technology and Secured Transactions (ICITST), London, England, Nov. 8-11, 2010, 8 pages.
Leicher et al., "Implementation of a Trusted Ticket System", IFIP Advances in Information and Communication Technology, Jun. 11, 2009, 12 pages.
Pashalidis et al., "Single Sign-On Using Trusted Platforms", ISC, 2003, 54-68.
PCT Application No. PCT/US2011/022141 :International Search Report and Written Opinion of the International Searching Authority, Apr. 21, 2011, 10 pages.
PCT Application No. PCT/US2011/024200: International Search Report and Written Opinion of the International Searching Authority, May 19, 2011, 12 pages.

(56) References Cited

OTHER PUBLICATIONS

Peng et al., "Trust of User Using U-Key on Trusted Platform", Signal Processing, The 8$^{th}$ International Conference on IEEE, Nov. 16, 2006, 4 pages.

Preneel et al., "MDx-MAC and Building Fast MAGs from Hash Functions", Proceedings Crypto '95, Aug. 1995, 14 pages.

Preneel et al., "On the Security of Two MAC Algorithms", Advances in Cryptology—EUROCRYPT '96, Nov. 17, 1995, 12 pages.

Urien, "An OpenID Provider based on SSL Smart Cards", Consumer Communications and Networking Conference (CCNC), 2010, 7th IEEE, Jan. 9-12, 2010, 2 pages.

VeriSign, "Security and Trust: The Backbone of Doing Business over the Internet", White Paper, Accessed Dec. 28, 2010, 8 pages.

Watanabe et al., "Federated Authentication Mechanism Using Cellular Phone—Collaboration with OpenID", Information Technology: New Generations, ITNG '09, Sixth International Conference on IEEE, Apr. 27, 2009, 435-442.

* cited by examiner

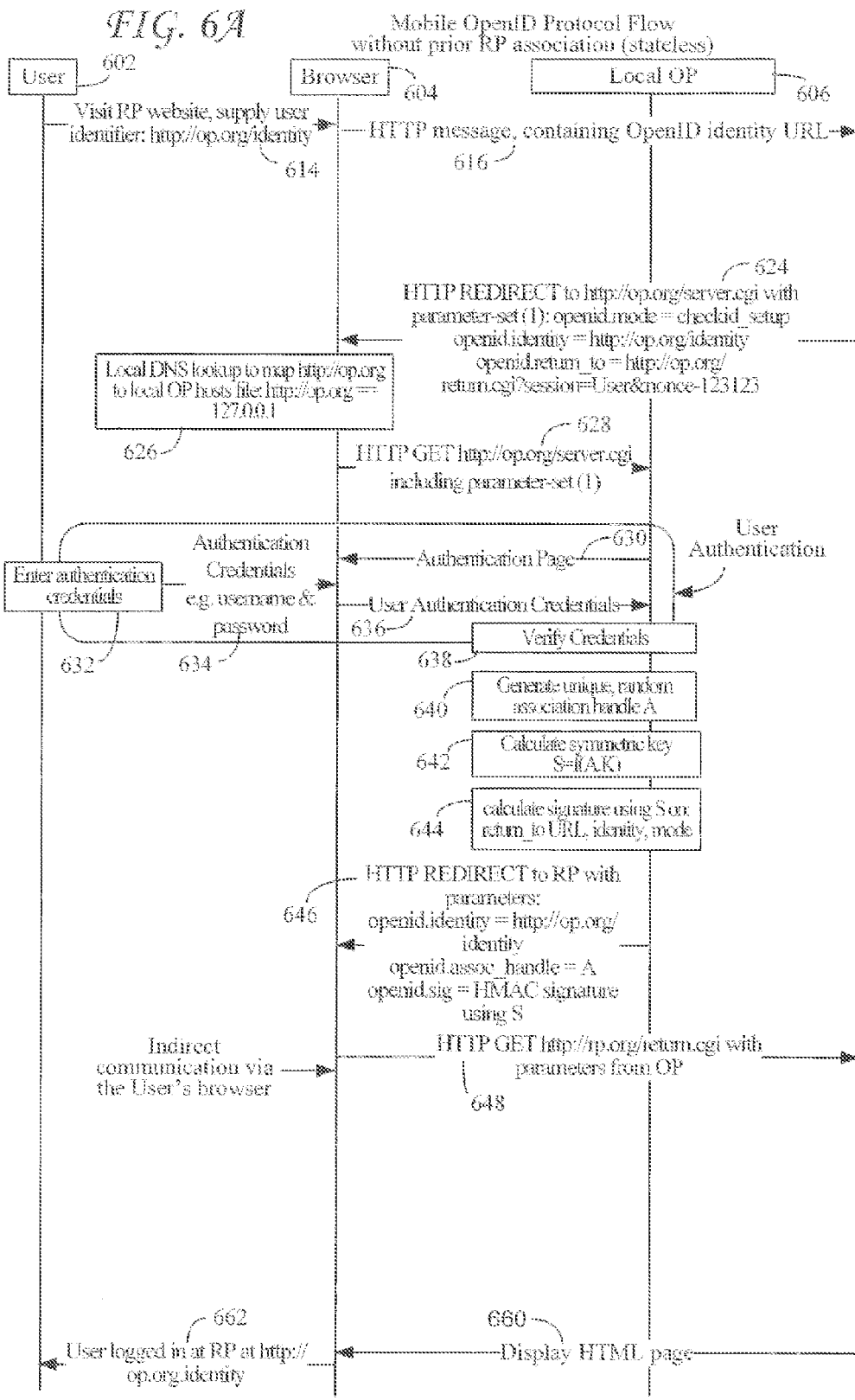

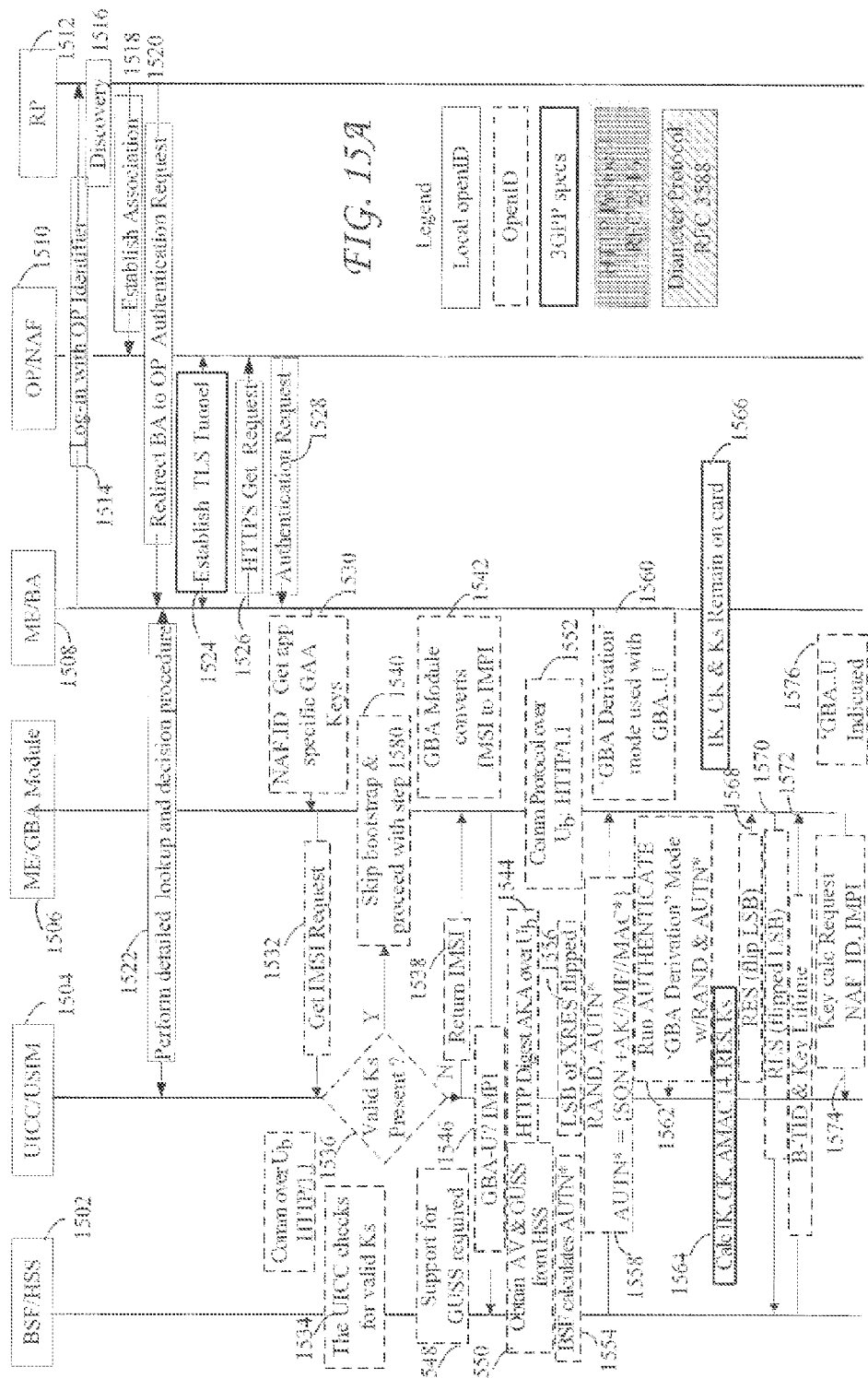

IDENTITY MANAGEMENT ON A WIRELESS DEVICE

CROSS REFERENCE TO RELATED APPLICATIONS

This application is a continuation of U.S. Ser. No. 13/964,751 filed Aug. 12, 2013 which is a divisional of U.S. Ser. No. 13/237,344 filed Sep. 20, 2011, now U.S. Pat. No. 8,509,431 which claims the benefit of U.S. Provisional Patent Application Ser. No. 61/403,729, filed Sep. 20, 2010, and U.S. Provisional Patent Application Ser. No. 61/428,388, filed Dec. 30, 2010, the contents of which are hereby incorporated by reference in their entirety.

BACKGROUND

An internet user often has multiple usernames and passwords that may be used for user authentication to access a plurality of websites. For example, the internet user may have one username/password combination that is used to access a social networking site, such as Facebook for example, and another username/password combination that is used to access an email site, such as Gmail for example. While multiple username/password combinations may be implemented for user authentication, the internet user may find it cumbersome to remember each username/password combination. For example, the internet user may forget their username/password combination for a website and, as a result, may not be able to access that website.

To make user authentication less cumbersome for the internet user, single log on solutions, such as OpenId, have been proposed. However, when a single sign on (SSO) is implemented as a webservice there are some drawbacks. For example, the user may not have a secure channel to the web based SSO provider. Additionally, the user may have limited control over the SSO provider.

Moreover, authentication in SSO may produce over the air interface communications, which may produce load on both the network entity (e.g., OpenID provider (OP) and/or NAF) and/or the network itself by increased traffic. Additionally, the MNO may have to bear the cost of this additional traffic.

SUMMARY

This Summary is provided to introduce various concepts in a simplified form that are further described below the Detailed Description.

Systems, methods, and apparatus embodiments are described herein for provisioning a session key, at a wireless device, associated with a service provider for use in local authentication. As described herein, a temporary key may be received that is derived from a network authentication between the wireless device and a network entity. Based on the temporary key, the session key associated with the service provider may be derived. The session key may be shared with the network entity and may be configured for use in a local authentication performed at the wireless device. The session key may be stored for use in local authentication at the wireless device.

Systems, methods, and apparatus embodiments are also described herein for performing local authentication at a wireless device. As described herein, an association handle may be received from a service provider that indicates that the service provider has performed an association with a network entity. Authentication information may be received that is associated with a user of the wireless device. The authentication information may be locally verified at the wireless device and a signature key may be generated based on the association handle and a session key associated with the service provider. The session key may be derived from a network authentication between the network entity and the wireless device and be configured for use in performing a local authentication at the wireless device. An identity assertion may be signed, using the signature key, to indicate that the wireless device has locally verified the authentication information.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to in limitations that solve any or all disadvantages noted in any part of this disclosure

BRIEF DESCRIPTION OF THE DRAWINGS

A more detailed understanding may be had from the following description, given by way of example in conjunction with the accompanying drawings wherein:

FIGS. 6A and 6B illustrate another example embodiment of a protocol flow for authentication of a user and/or wireless device using local authentication;

FIGS. 15A and 15B illustrate an example embodiment of a protocol flow for provisioning for an SSO protocol;

DETAILED DESCRIPTION OF ILLUSTRATIVE EMBODIMENTS

Figure 1:
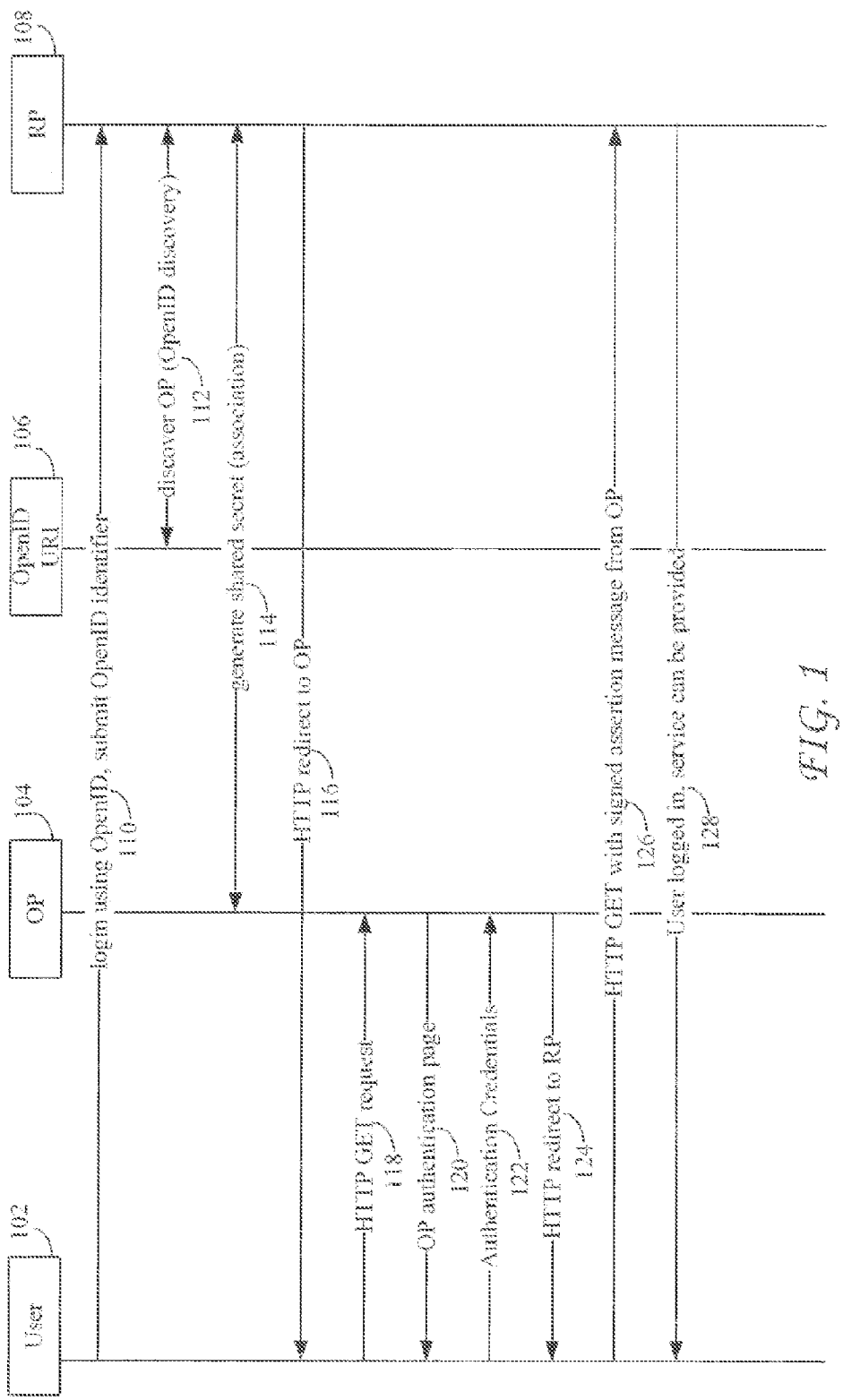
FIG. 1 illustrates an example embodiment of a protocol flow for an OpenID protocol run.

When referred to hereafter, the terminology "wireless transmit/receive unit (WTRU)" may include, but is not limited to, a user equipment (UE), a mobile station, a fixed or mobile subscriber unit, a pager, a cellular telephone, a personal digital assistant (PDA), a computer, a machine-to-machine (M2M) device, a sensor, a femto cell, an access point, or any other type of device capable of operating in a wireless environment. When referred to hereafter, the terminology "Node-B" may include, but is not limited to, a base station, a site controller, an access point (AP), a femto cell, or any other type of interfacing device capable of operating in a wireless environment.

Described herein are embodiments for local and distributed, mobile OpenID providers, implemented on WTRUs, smartcards, H(e)NBs, and/or other types of devices. While the embodiments herein may be described in the context of the OpenID protocol, the embodiments are extendable to other single sign-on (SSO) protocols and/or federated identity protocols. Similarly, as OpenID entities may be described herein, the OpenID entities are extendable to other entities that perform the same, or similar, functions. For example, the functions described herein as being performed by the relying party (RP) may be performed by any service provider.

Local Mobile SSO protocols, such as local mobile OpenID for example, may allow a locally located module or entity to perform identity authentication/assertion functions as part of an SSO and/or identity management protocol, such as the OpenID protocol for example. The locally located module may be a smartcard, a USIM, a UICC, a Java card, a smartcard web server (SCWS) enabled SmartCard, or other trustworthy entity.

Local Mobile SSO is a term used to collectively indicate implementations whereby part or whole of the single sign-on (SSO) and/or related identity management functions that may be performed by a web-based SSO server are performed instead by a locally-based entity and/or module which is a part or whole of the communicating device itself, or where such entity/module is physically and/or logically located (e.g., locally located) in close vicinity of the communicating device and/or its user. For example, an entity or module may be embedded in a device, attached to the device, and/or connected by local interfaces, wiring, and/or short-range wireless means to the device.

Local OpenID may also be used as a term to indicate a subset of Local Mobile SSO implementations whereby the implementation of SSO and/or identity management may be based on the OpenID protocol. For example, Local OpenID may be used to indicate the functions of an OpenID Identity Provider (OP or OpenID IdP) that may be performed by a locally located entity or module.

Local OP is a term used to indicate the entity or module that performs functions of an OpenID server locally on a device. The acronym OPloc may be used to denote a local OP. One of the implementations of a local OP may be to facilitate authentication of the user and/or the device through assertion(s) about the identity of the user and/or the device. Such an assertion may be sent from the local OP to a browser or browser agent (BA) running on the device, which then may forward the assertion to the external Relying Party (RP). When the function(s) provided by a local OP is primarily limited to providing such identity assertion, the local OP may be referred to as a Local Assertion Provider (LAP).

A local OP may process, create, manage, and/or send identity assertion messages to one or more external recipients. The identity assertion messages may assert the state of verification of one or more identifiers relating to a user and/or a device. For example, in the OpenID protocol, a third-party entity called the Relying Party (RP) may be one of the recipients of the identity assertion message. The local OP may also sign identity assertion messages using a signature, encryption key, cryptography, or the like.

Local OpenID methods may use one or more cryptographic keys, such as a root session key. The root session key may be denoted by Krp and may be a session key intended for use between the RP and the OP. The session key may also be the K_(ext/int)_NAF or another key stored in a smart card for example. The session key (e.g., Krp) may also serve as a session key between the RP and the OP from which other keys may be derived. The session key may be derived from an association between the network and the wireless device (e.g., local OP). Local OpenID may also use an assertion key or signing key, which may be denoted by Kasc. The signing key (e.g., Kasc) may be used to sign one or more of the identity assertion message(s) for authentication of a user and/or a device. The signing key (e.g., Kasc) may be derived from the session key (e.g., Krp).

Local OpenID methods may also use a service called OpenID Server Function (OPSF), whose role may be to generate, share, and/or distribute secrets that may be used by the Local OP and/or the Relying Party (RP). The OPSF and the local OP may be viewed by the external RP as a single entity. The OPSF may also be able to verify signatures issued by the local OpenID, and may be directly reachable by the RP, for example, via the public internet. The browser on the device may be redirected to the local OP by modifying the local DNS resolving cache on the device such that the address of the OPSF maps to the local OP.

Local OpenID methods may also use a service denoted by OP-agg, whose role may be to facilitate discovery of local OP on behalf of the RP.

SSO protocols, such as OpenID, may be integrated with Generic Bootstrap Architecture (GBA). GBA is a way to bootstrap application-layer keys from access-layer keys. The method for integrated OpenID with GBA may include a separate provisioning phase and/or an authentication phase. The provisioning phase may be where some credentials are provisioned for later authentication. The authentication phase may be where the earlier provisioned credentials may be used for local assertion of user identity.

Local authentication, such as local authentication towards a local OpenID Provider (OP) for example, may reduce over the air traffic on a network. The local authentication may be performed after an authentication process between the network and the wireless device for example. The local OP may be associated with a local web server on a wireless device, such as a smart card web server (SCWS) for example. For example, the local OP may include the local web server or the local web server may be included in or built on top of the local OP. As disclosed herein authentication traffic may be local, and may not burden the network itself. A shared secret or session key may be established between the network entity (e.g., OpenID Server Function (OPSF)) and a local OP for each RP the user visits. The shared secret or session key may be established from authentication performed between the network entity and the wireless device with which the local OP is associated. Several exemplary mechanisms for the establishment of such a secret are disclosed herein. If associations are used by the RPs, they may store the secret or session key used for signature verification and may re-use it when the user visits them the next time. If, however, the replying party (RP) uses the stateless mode, the RP may not save the secret or session key. Also in this stateless case, the OP may create a secret and may share it securely with the OPSF. The local OP may store this secret or session key and may reuse it when the user visits the RP the next time. Additionally, the OPSF may store the secret or session key such that the OPSF may use it directly for signature verification, such as in the stateless mode for example. By storing and/or reusing secrets or session keys, the embodiments described herein may reduce the network traffic.

In an example embodiment, local authentication may be performed towards a local OP. The local OP may be associated with a smart card web server (SCWS) for example. A shared secret or session key may be established between a network OPSF entity and the local OP for a relying party (RP) associated with a user visit. For example, the shared secret or session key may be established based on an authentication between the network and the wireless device and/or local OP. According to one embodiment, the shared secret or session key may be derived from a network authentication key generated from the authentication between the network and the wireless device and/or local OP. The shared secret or session key may be stored by the local OP. The shared secret or session key may then be reused, such as for subsequent authentication to network entities for example.

In an example embodiment, network traffic may be minimized while performing local authentication towards a local OP. A user-supplied identifier may be transmitted to a replying party (RP). A redirect may be received from the RP including an association handle in the request parameters. A local request may be transmitted for authentication to the local OP. Authentication with the local OP may occur. A redirect may be received from the local OP including the association handle and a signed parameter.

In an example embodiment, domain name system (DNS) look-up may be used. For example, DNS look-up may be used to bypass Bootstrap Function (BSF) Client in an SSO protocol. A DNS lookup may be used to find the local OpenID Provider (OP). Additionally, a DNS lookup may be used to bypass the GBA Module.

In an example embodiment, the binding of keys for SSO protocol to GBA derived keys may be performed. For example, session key (e.g., Krp) and signing key (e.g., Kasc) may be derived and/or used for local Mobile OpenID protocols and may be bound through cryptographic association to the GBA-derived temporary key (e.g., Ks_int_NAF). Session key (e.g., Krp) may be associated with the relying party (RP) through which the signing key (e.g., Kasc) may be derived. The signature key (e.g., Kasc) may be used to sign the identity assertion message for authentication of the user. The temporary key (e.g., Ks_int_NAF) may be a key that is derived from a GBA_U (UICC-centric GBA process, such as described in 3GPP TS 33.220 for example) inside a UICC, for use for applications.

In an example embodiment, an independent secure channel may be set up and/or used between an RP and a user equipment (UE), as part of an SSO protocol, such as the OpenID protocol. This may be done, for example, to establish an independent secure communication channel between a RP and UE independently of the OP. This may enable separation of security between the OP and the user/RP pair, and may provide a means to limit damages from security breaches to the OP.

In an example embodiment, SSO protocols may be integrated with authentication and key agreement. For example, OpenID may be integrated with authentication and key agreement (AKA) (such as AKA depicted in 3GPP TS 33.102 for example).

In the embodiments herein describe authentication using a local OpenID Provider (OP) associated with a wireless device. For example, the local OP may reside on the wireless device, be attached to the wireless device, and/or connected by local interfaces, wiring, and/or short-range wireless means to the wireless device. According to one embodiment, the local OP may be associated with a local web server on the wireless device, such as a smartcard web server (SCWS) for example. The local OP may include the local web server. Alternatively, or additionally, the local web server may be built on top of the local OP or the local OP may be located on the local web server.

In the embodiments described herein may implement network communications that may be performed using local communications, over the air communications, and/or fixed line communications. When local communication is implemented, there may be little or no load on a mobile network operator (MNO)/air network, no traffic over other (fixed line, or non-MNO) networks, and/or communication may take place inside the wireless device. Over the air communications may be carried out over an MNO/air network, as data traffic (e.g., HTTP and/or IP based communication), and may represent load on the MNO/air network. Using over the air communications, traffic may not be reduced to zero, as a user may use the wireless device to access a web service, which may generate a considerable amount of traffic to enable the user to visit the web service and/or retrieve the content. OpenID may be one part of a process, such as user authentication, which may add traffic to the content retrieval process. The embodiments described herein may be used to reduce the traffic introduced by network authentication using over the air communications. Network traffic may also occur over a fixed line internet, and/or may use existing infrastructure. Fixed line communication may not increase the load on the MNO/air interface network.

FIG. 1 illustrates an example embodiment of a protocol flow for an OpenID protocol run. The protocol flow may be, for example, the protocol flow for the standard OpenID protocol run. Additionally, the protocol flow may be used, for example, to access a relying party (RP) from a WTRU using a web-based OpenID OP server, such as myopenid.com for example.

The protocol flow illustrated in FIG. 1 may not involve local traffic, but may involve over the air and/or fixed line communications. The traffic that is offloaded from the air network in FIG. 1 may be a fixed line communication used for the discovery process at 112 and/or the association establishment between RP 108 and network OP 104 at 114. Since the network OP 104 may be a web service, communications between user 102 (e.g., a user of a device, a browser, or other application running on the device, and/or the device itself) and network OP 104 may be over the air interface.

As illustrated in FIG. 1, at 110, user 102 may login to Relying Party 108, such as by using OpenID for example. For example, user 102 may submit an OpenID identifier to RP 108. At 112, RP 108 may discover the network OpenID Provider (OP) 104 by communicating with OpenID URI 106. After discovering network OP 104, RP 108 may perform an association with network OP 104 at 114. For example RP 108 and network OP 104 may generate a shared secret. At 116, RP 108 may send a redirect message (e.g., HTTP redirect message) to user 102, redirecting user 102 to network OP 104. User 102 may send a request (e.g., an HTTP GET request) for an authentication page to network OP 104 at 118. Network OP 104 may send an OP authentication page to user 102 at 120 to authenticate user 102. User 102 may send authentication credentials to network OP 104 at 122. Network OP 104 may send a redirect message (e.g., HTTP redirect message) to user 102 at 124, redirecting user 102 to RP 108. At 126, user 102 may send a message (e.g., HTTP GET message) to RP 108 requesting login to services. The message may include a signed identity assertion from network OP 104 indicating that user 102 has been authenticated by network OP 104. RP 108 may enable user 102 to access its services based on the identity assertion message and, at 128, RP 108 may indicate to the user 102 that the user is logged in and may access services.

According to one embodiment, steps 112 and/or 114 of the protocol flow illustrated in FIG. 1 may be performed over a fixed line internet, so as not to increase the load on the MNO/air interface network for example. The other steps illustrated in FIG. 1 may be over the air communications, which may be carried out over an MNO/air network for example, as data traffic (e.g., HTTP, IP based communication), and/or may represent load on the MNO network. Traffic may not be reduced to zero, as user 102 may use a device to access a web service, which may generate traffic that enables the user 102 to visit the web service and/or retrieve the content. OpenID may be one part of a process, such as user authentication, which may add traffic to the content retrieval process. Reducing the network authentication as described herein may reduce the overall traffic on the network.

Figure 2:
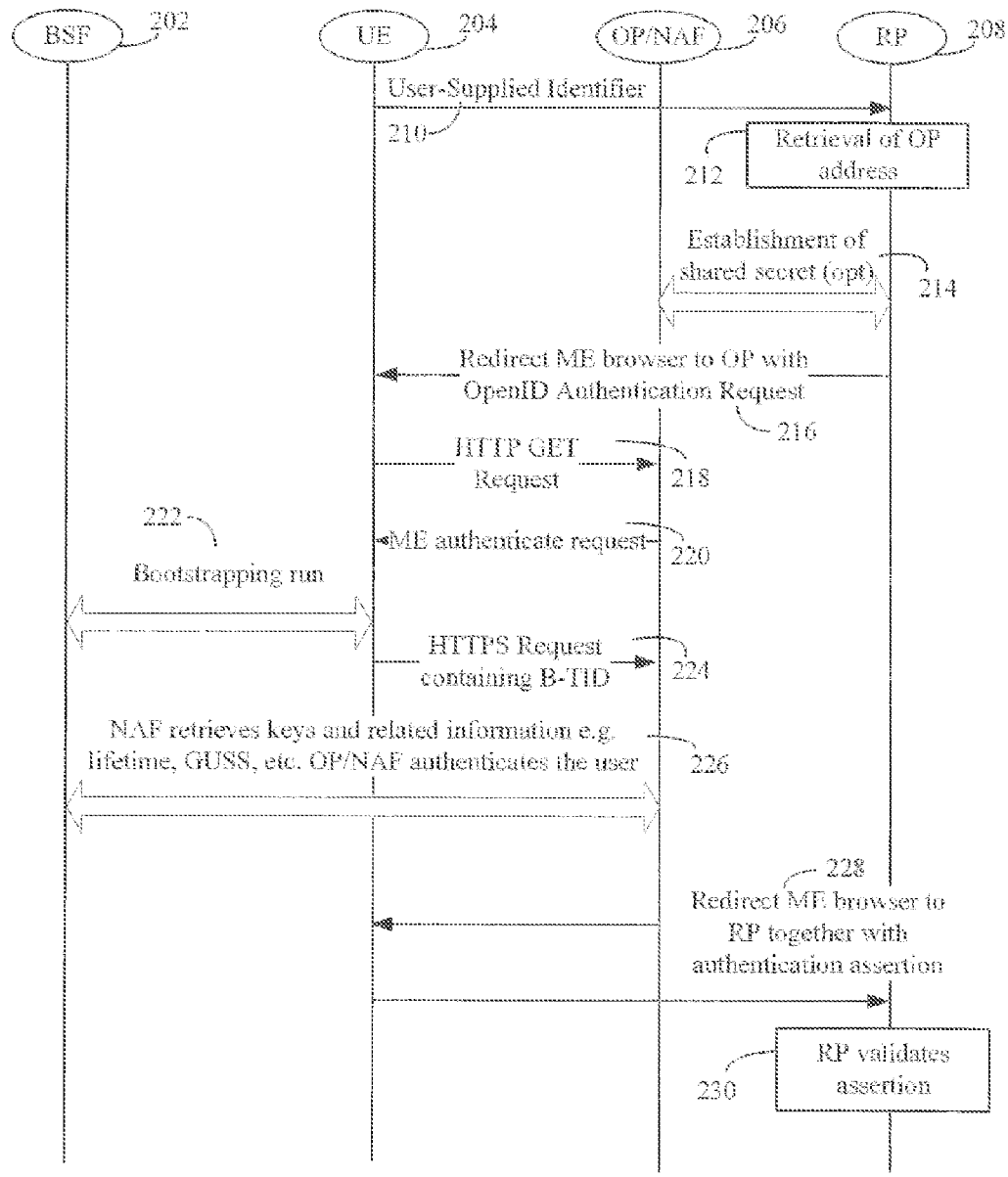
FIG. 2 illustrates an example embodiment of traffic flow for OpenID/GBA.

FIG. 2 illustrates an example embodiment of traffic flow for OpenID/GBA. As illustrated in FIG. 2, user equipment (UE) 204 may send a user-supplied identifier to RP 208 at 210. RP 208 may retrieve an OP address at 212 for communicating with the network OP/NAF 206. RP 208 may (e.g., optionally) establish a shared secret with network OP/NAF 206 at 214. At 216, RP 208 may redirect the UE 204 to network OP/NAF 206. For example, the RP 208 may redirect a browser on UE 204 with an OpenID authentication request. At 218, UE 204 may send a request (e.g., an HTTPS GET request) for authentication to OP/NAF 206. OP/NAF 206 may send an authentication request to UE 204 at 220. At 222, UE 204 and BSF 202 may perform a bootstrapping run, as described herein for example. UE 204 may send a request message (e.g., HTTPS request message) to OP/NAF 206 at 224. The request message may include a bootstrapping transaction identifier (B-TID). At 226, OP/NAF 206 may retrieve keys and/or related information (e.g., lifetime, GUSS, etc.) from BSF 202 and authenticate the user. OP/NAF 206 may send a redirect message to UE 204 at 228, redirecting UE 204 to RP 208. For example, OP/NAF 206 may redirect the ME browser to RP 208. The redirect message may be sent together with an identity authentication assertion indicating that the user 204 has been authenticated. At 230, RP may validate the authentication assertion received by UE 204 at 228.

As illustrated in FIG. 2, communication may take place over an air network, despite the association steps between RP and MNO. However, compared to a web based OP, the traffic may be increased in OpenID/GBA, since additional steps (steps 222 and 226) for authentication may put a burden on the air data network as well as on the back-end services for GBA authentication, such as the BSF and/or NAF subsystems. So in the traffic flow illustrated in FIG. 2, an increase in air network traffic and an increase in load on network entities may occur.

Figure 3:
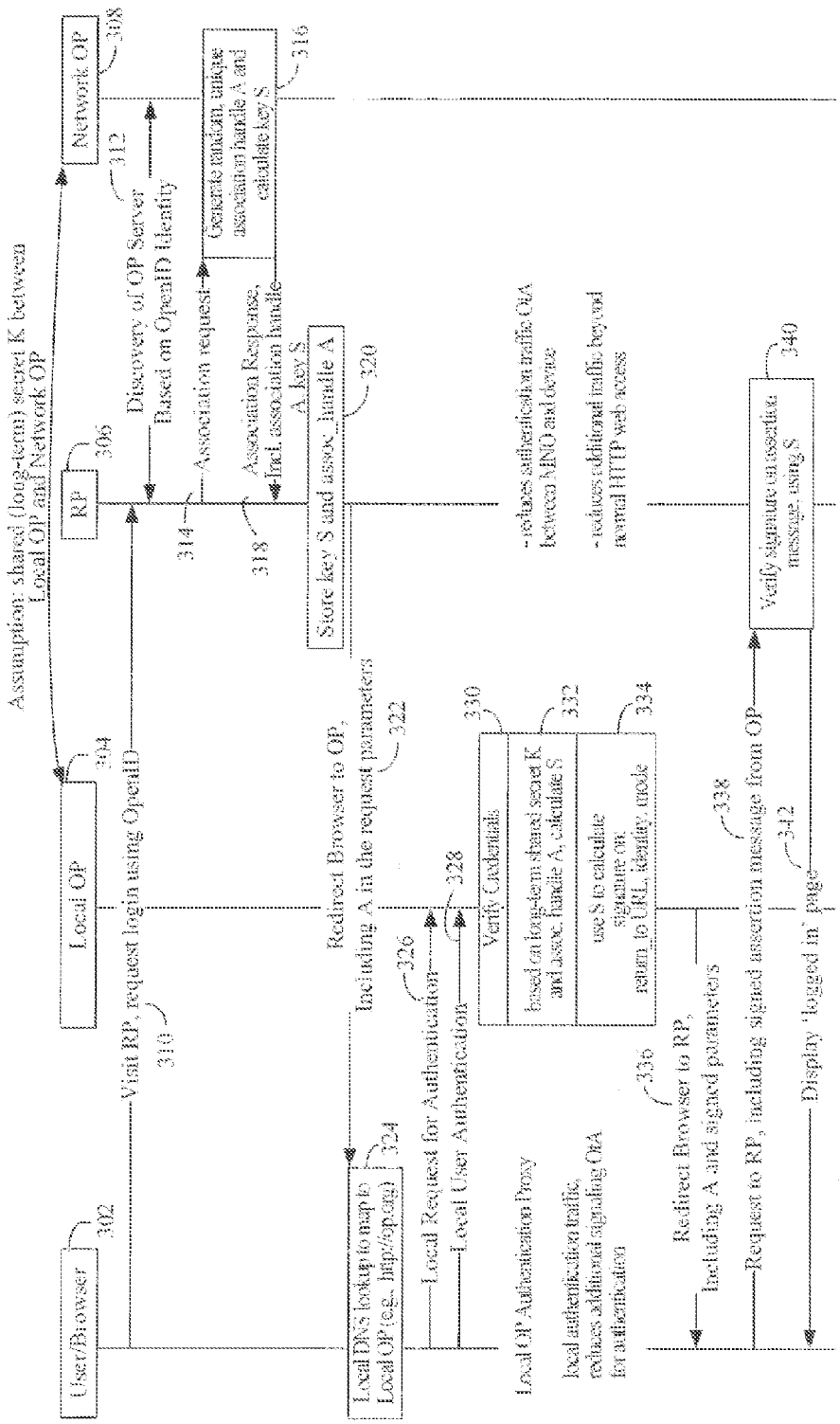
FIG. 3 illustrates an example embodiment of a protocol flow for authentication of a user and/or wireless device using local authentication.

FIG. 3 illustrates an example embodiment of a protocol flow using local OP. As illustrated in FIG. 3, the air network traffic may be reduced by offloading traffic to the local device. For example, authentication traffic between user/browser 302 and local OP 304 may be performed locally and may not put a burden on the air network or the network services. Additionally, discovery and/or association traffic between RP 306 and network OP 308 may not occur via air network and may occur over other infrastructures, such as fixed line public internet for example. Other traffic shown in FIG. 3 may take place over an air network for example.

The entities illustrated in FIG. 3 include user/browser 302, local OP 304, RP 306, and network OP 308. User/browser 302 may include a wireless device, such as a WTRU for example, a user associated with the wireless device, and/or a browser or other application running on the wireless device. The local OP 304 may be an entity residing locally on the wireless device, or connected directly to the wireless device, that acts as a proxy for a network OP residing at the network, such as the network OP 308 for example. The local OP 304 may be associated with a local web server residing on the wireless device, such as a smart card web server (SCWS) for example. Network OP 308 is an OP that is external to the wireless device on which the local OP 304 resides or is connected. For example, network OP 308 may be an OP associated with an MNO and/or network entity.

As illustrated in FIG. 3, an RP 306 may receive a request for login at 310 from user/browser 302. The request for login may be a request for login using OpenID for example. At 312, RP 306 and network OP 308 may perform discovery. The discovery may be of an OP server and/or may be based on OpenID identity for example. RP 306 may send an association request to network OP 308 at 314. OP 308 may generate a random, unique association handle A and/or calculate a signature key S (e.g., Kasc) at 316. Network OP 308 may send an association response to RP 306 at 318. The association response may include association handle A and/or signature key S (e.g., Kasc). At 320, RP 306 may store signature key S (e.g., Kasc) and/or association handle A. At 322, RP 306 may send a redirect message to user/browser 302. The redirect message may redirect user/browser 302 to local OP 304. The redirect message may include association handle A in the request parameters.

User/browser 302 may perform a local DNS lookup, at 324. The DNS lookup may be used to find the local OP 304 for example. At 326, local OP 304 may receive a local request for authentication from user/browser 302. Local OP 304 and user/browser 302 may perform local user authentication at 328. In the local user authentication at 328, local OP may send an OP authentication page to the user/browser 302 and/or the user/browser 302 may send authentication information (e.g., authentication credentials) to the local OP 304. At 330, local OP 304 may verify the authentication information (e.g., authentication credentials). Local OP 304 may also calculate signature key S (e.g., Kasc) at 332. Signature key S (e.g., Kasc) may be the same key as calculated by network OP 308 at 316 and/or stored by RP 306 at 320. Signature key S (e.g., Kasc) may be calculated based on a long-term shared secret or session key K (e.g., Krp, K_(ext/int)_NAF, or another key stored in a smart card) and association handle A. Long-term shared secret or session key K (e.g., Krp, K_(ext/int)_NAF, or another key stored in a smart card) may be a key shared with network OP 308. This session key may be derived from a network authentication performed between the network and the wireless device associated with the local OP and/or the local OP itself. The association handle A may be the handle generated by network OP at 316, during association. Signature key S (e.g., Kasc) may be used by the local OP 304 to calculate a signature at 334, which may be included in an identity assertion indicating that the local OP has locally verified the authentication information from user/browser 302. At 336, local OP 304 may send a redirect message to user/browser 302. The redirect message may include association handle A and/or parameters signed using the signature calculated at 334.

At 338, user/browser 302 may send a request to RP 306. The request may include a signed identity assertion message from local OP 304. RP 306 may verify the signature on the identity assertion message at 340. For example, RP 306 may verify the signature on the identity assertion message using signature key S (e.g., Kasc) calculated by network OP 308 at 316, and received by RP 306 at 318. If the signature is properly verified at 340, RP 306 may enable user/browser 302 to access services over the network. RP 306 may indicate that user/browser 302 may access such services by sending a 'logged in' page display to user/browser 302 at 342.

Figure 4:
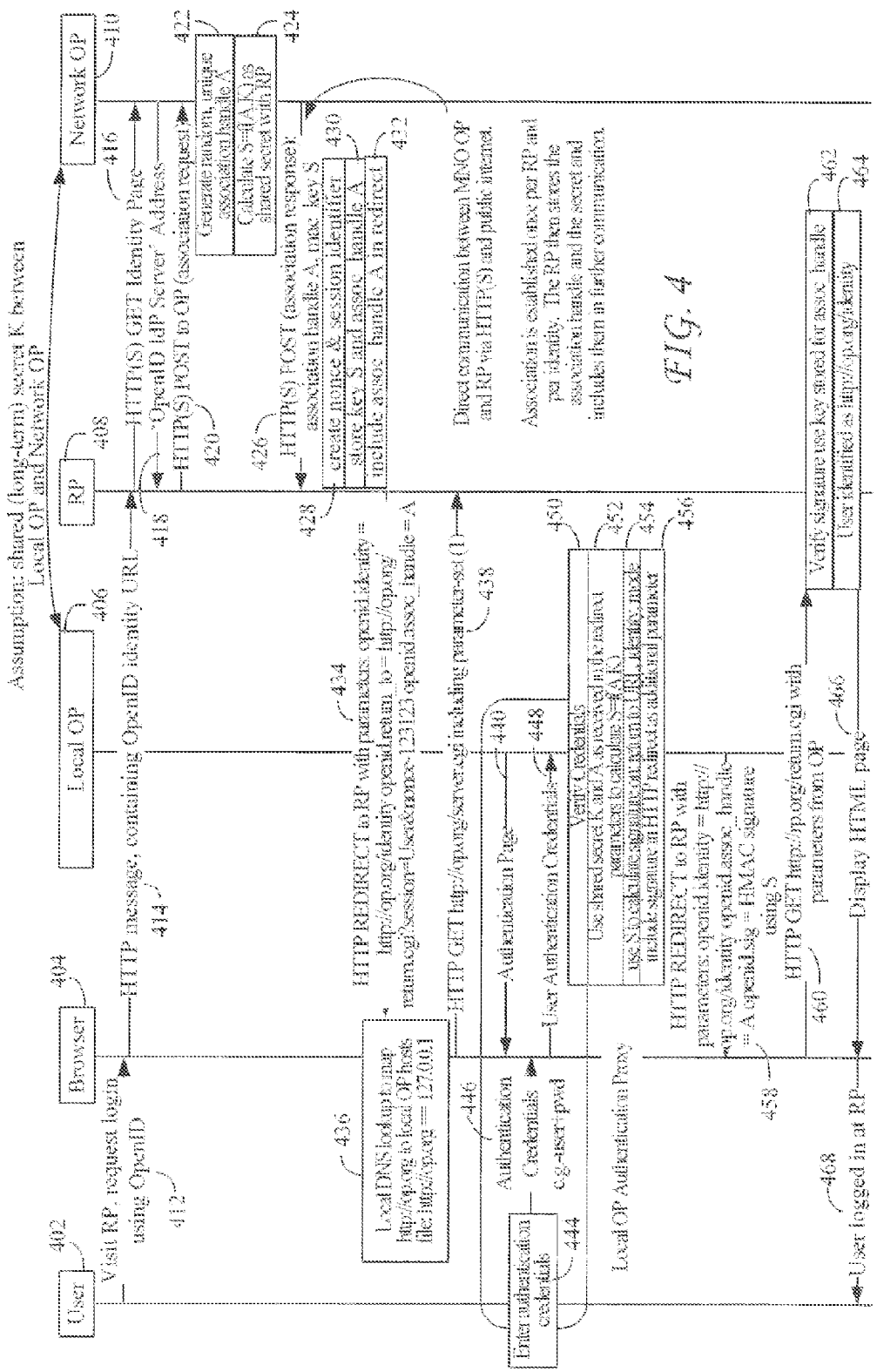
FIG. 4 illustrates another example embodiment of a protocol flow for authentication of a user and/or wireless device using local authentication.

FIG. 4 illustrates another example embodiment of a protocol flow using local authentication. As illustrated in FIG. 4, the air network traffic may be reduced by offloading traffic to the local device. For example, authentication traffic between user 402, browser 404, and/or local OP 406 may be performed locally and may not put a burden on the air network or the network services. Additionally, discovery and/or association traffic between RP 408 and network OP 410 may not occur via air network and may occur over other infrastructures, such as fixed line public internet for example. Other traffic illustrated in FIG. 4 may take place over an air network for example.

The entities illustrated in FIG. 4 include a user 402, a browser 404, a local OP 406, an RP 408, and a network OP 410. User 402 may include a wireless device, such as a WTRU for example, a user associated with the wireless device, and/or an application being executed on the wireless device. Browser 404 may include a web browser or other application being executed on the wireless device. The local OP 406 may be an entity residing locally on the wireless device that acts as a proxy for an OP residing outside of the wireless device, such as the network OP 410 for example. The local OP 406 may be associated with an SCWS residing on the wireless device. Network OP 410 may be an OP that is external to the wireless device on which the local OP 406 resides and/or is associated. For example, network OP 410 may be an OP associated with an MNO.

As illustrated in FIG. 4, user 402 may attempt to access services via browser 404. For example, user 402 may visit a website associated with RP 408 at 412. User 402 may also supply a user identifier (e.g., OpenID identifier) to browser 404 at 412. At 414, browser 404 may send a request message (e.g., an HTTP message) to RP 408. The request message may contain an OpenID Identity URL for example. RP 408 and network OP 410 may perform discovery of OP server. For example, RP 408 may send a request message (e.g., an HTTP(S) GET identity page message) to network OP 410 at 416. RP 408 may receive a response from network OP 410 at 418. The response may include an OpenID OP server address for example. RP 408 may send an association request to network OP 410 at 420. For example, the association request may include an HTTP(S) post to network OP 410. Network OP 410 may generate a random, unique association handle A at 422. At 424, network OP 410 may calculate a signature key S (e.g., Kasc) as a shared secret with RP 408. Signature key S may be calculated using the association handle A generated at 422 and long-term secret or session key K (e.g., Krp) that is shared between the network OP 410 and the local OP 406, for example. The session key may be derived from an authentication performed between the network and the wireless device (e.g., local OP). At 426, network OP 410 may send an association response to RP 408. For example, the association response may include an HTTP(S) post. The association response at 426 may include association handle A generated at 422 and/or signature key S (e.g., Kasc) calculated at 424.

RP 408 may create a nonce and/or session identifier at 428. At 430, RP 408 may store signature key S (e.g., Kasc) and/or association handle A. At 432, RP 408 may include the association handle A in a message to be sent to the browser 404. For example, the association handle A may be included in a redirect message configured to be sent to the browser 404. The association handle A may be sent to the browser 404 at 434. For example, a redirect message (e.g., HTTP redirect message) including the association handle A may be sent to browser 404.

User 402, browser 404, and/or local OP 406 may perform local authentication at a device capable of communicating with a network, such as a wireless device for example. At 436, the browser may perform a local DNS lookup. For example, the DNS lookup may be used to find the local OP 406. Using the DNS lookup, the browser 404 may request a web page URL (e.g., opened.provider.com). Using the DNS lookup, the URL may be transformed into an IP address. The browser 404 may perform a lookup for fixed mappings of the described form in a local table or host. If it does not include a mapping for the requested URL, the device may perform a lookup with a remote Domain Name Server (DNS). At 436, the browser 404 may access a local IP address (e.g., the IP address of a web server associated with the local OP 406), when the browser 404 requests a page from the OP URL, which may be provided by a user as part of the user's identity (e.g., OpenID identity). The IP address of the local OP 406 may be a private or local address. Therefore, the web server associated with the local OP may be reachable from the wireless device on which the local OP resides or is associated.

Browser 404 may send a message to local OP 406 at 438. The message may include parameters received by browser 404 from RP 408. Local OP 406 may send an authentication page to browser 404 at 440, which may be displayed to user 402. At 444, user 402 may enter authentication information (e.g., authentication credentials) and the authentication information (e.g., authentication credentials) may be sent to browser 404 at 446. Local OP 406 may receive the authentication information (e.g., authentication credentials) from browser 404 at 448 and verify the authentication information (e.g., authentication credentials) at 450.

At 452, local OP 406 may calculate a signature key S (e.g., Kasc) using a session key K (e.g., Krp), that is shared with network OP 410, and association handle A, that was received in the redirect parameters at 438. The session key K (e.g., Krp) may be derived from an authentication between the network and the wireless device associated with the local OP 406. Signature key S (e.g., Kasc) may be used to calculate a signature for use on an identity assertion at 454. For example, the signature may be used to indicate that the local OP 406 has locally verified the authentication information. The signature calculated at 454 may be included in a message to browser 404 at 456. For example, the signature may be included as a parameter in an HTTP redirect message. The redirect message may be sent to browser 404 at 458. The redirect message at 458 may include association handle A and/or may be signed using the signature calculated using signature key S (e.g., Kasc). Browser 404 may send a message to RP 408 at 460 that indicates that the user 402 has been properly authenticated. For example, browser 404 may send an HTTP GET message with authentication parameters from the local OP 406, such as the signature calculated from signature key S (e.g. Kasc) and the association handle A. RP 408 may verify the signature and may use the key stored for association handle A at 462. User 402 may be identified at 464 and the RP 408 may display a page (e.g., an HTML page) indicating user login to the browser 404 at 466. At 468, the browser 404 may indicate to the user 402 that the user is logged in at RP 408.

Figure 5A:
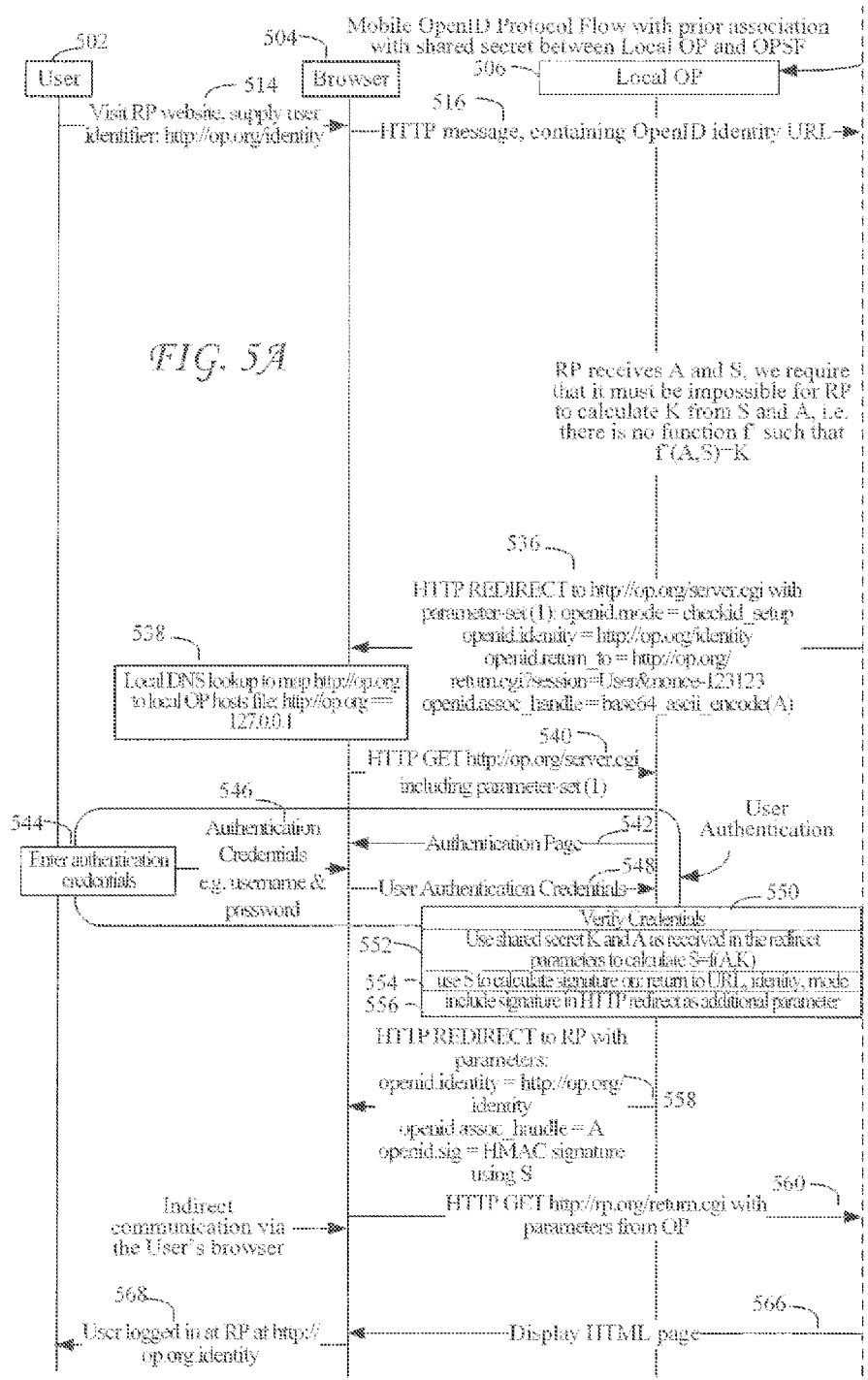
FIGS. 5A and 5B illustrate another example embodiment of a protocol flow for authentication of a user and/or wireless device using local authentication.
Figure 5B:
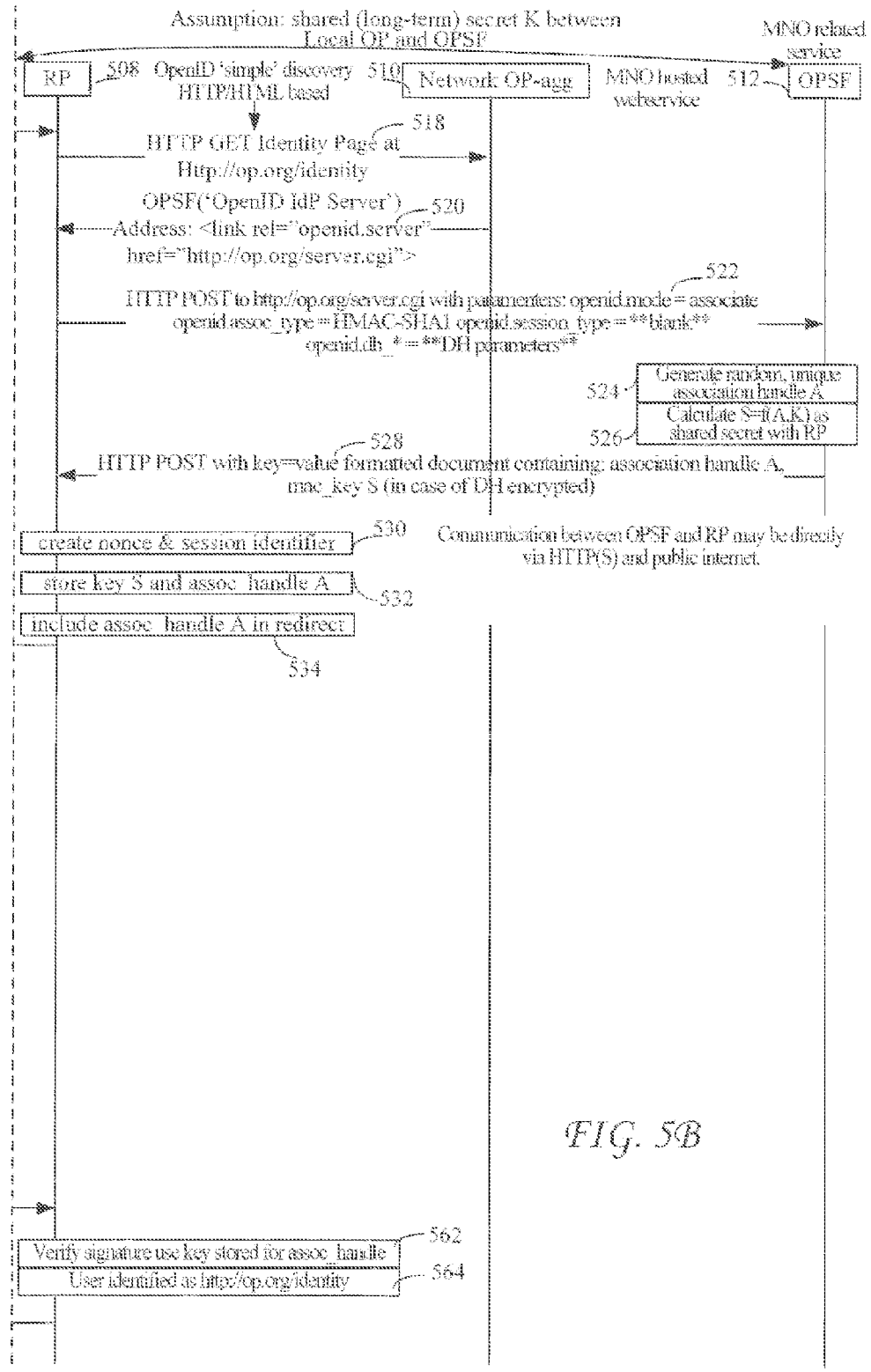

FIGS. 5A and 5B illustrate another example embodiment of a protocol flow using local authentication. As illustrated in FIGS. 5A and 5B, the air network traffic may be reduced by offloading traffic to the local device. For example, authentication traffic between the user 502, browser 504, and/or local OP 506 may be local and may not put a burden on the air network or the network services. Additionally, discovery and/or association traffic between the RP 508, network OP-agg 510, and/or OpenID IdP Server (OPSF) 512 may not occur via air network and may occur over other infrastructures, such as fixed line public internet for example. Other traffic illustrated in FIGS. 5A and 5B may take place over an air network for example.

The entities illustrated in FIGS. 5A and 5B include a user 502, a browser 504, a local OP 506, an RP 508, a network OP-agg 510, and an OpenID IdP Server (OPSF) 512. User 502 may include a wireless device, such as a WTRU for example, a user associated with the wireless device, and/or an application being executed on the wireless device. Browser 504 may include a web browser or other application being executed on the wireless device. The local OP 506 may be an entity residing locally on the wireless device that acts as a proxy for an OP residing on a network communicating with the wireless device, such as the network OP-agg 510 for example. The local OP 506 may be associated with a local web server on a wireless device, such as a SCWS for example. Network OP-agg 510 may be an OP that is external to the wireless device on which the local OP resides and/or is associated. For example, network OP-agg 510 may be an OP associated with an MNO, such as an MNO hosted web server for example. OPSF 512 may also be associated with an MNO, such as an MNO related service for example.

As illustrated in FIGS. 5A and 5B, at 514, user 502 may visit a website associated with RP 508 using browser 504. At 516, browser 504 may send a message to RP 508. The message at 516 may contain an OpenID identity URL. The message may be an HTTP message, for example. RP 508 may send a discovery message (e.g., HTTP GET IdentityPage message) at 518 to network OP-agg 510. In response, RP 508 may receive an OPSF address from network OP-agg 510 at 520.

RP 508 may send an association message (e.g., POST message) to OPSF 512 at 522. The communication between the RP 508 and the OPSF 512 may occur via an HTTP(S) and/or public internet communication for example. OPSF 512 may generate a random, unique association handle A at 524. At 526, OPSF 512 may calculate a signature key S (e.g., Kasc). Signature key S (e.g., Kasc) may be calculated using the association handle A and a secret or session key K (e.g., Krp) shared with local OP 506. The session key K (e.g., Krp) may be derived from a network authentication performed between the network and the wireless device associated with the local OP. At 528, OPSF 512 sends the association handle A and calculated signature key S (e.g., Kasc) to RP 508. Association may be established once in a given time period, such as per RP and/or per identity for example. The RP 508 may include the signature key and/or association handle in further communications.

At 530, RP 508 may create a nonce and/or a session identifier. RP 508 may store signature key S (e.g. Kasc) and/or association handle A at 532. At 534, RP 508 may include the association handle A in a redirect message to browser 504 and send the redirect message at 536. According to an embodiment, the redirect message may be an HTTP redirect message that includes parameters that include the association handle A.

User 502, browser 504, and local OP 506 may perform local authentication of user 502 at a wireless device capable of communicating with the network, such as a WTRU for example. At 538, browser 504 may perform a local DNS lookup. For example, the DNS lookup may be used to find the local OP 506. The DNS lookup may be performed as described herein for example. Browser 504 may send a message (e.g., HTTP GET message) to local OP 506 at 540 that includes the parameters received from RP 508. Specifically, local OP 506 may receive association handle A from browser 504. At 542, local OP 506 may send an authentication page to browser 504, which may be displayed to user 502. User 502 may enter authentication information (e.g., authentication credentials) at 544 and the browser 504 may receive the authentication information (e.g., authentication credentials) from user 502 at 546. Browser 504 may send the user authentication information (e.g., authentication credentials) to the local OP at 548. At 550, local OP 506 may verify the authentication information (e.g., authentication credentials). The local OP 506 may use the shared secret or session key K (e.g., Krp), that is shared with OPSF 512, and association handle A, as received in the redirect parameters, to calculate signature key S (e.g., Kasc) at 552. At 554, signature key S (e.g., Kasc) may be used to calculate a signature used to sign an identity assertion. The signature may be included as a parameter in a redirect message (e.g., HTTP redirect message) at 556. The signature may be used to indicate to the network that the user has been locally authenticated by the local OP 506. The redirect message may be sent to browser 504 at 558 and may include parameters including the signature.

The redirect message at 558 may redirect the browser to RP 508. The redirect message at 558 may be one way for the local OP 506 to communicate with the RP 508. At 560, browser 504 may send a message (e.g., HTTP GET message) to RP 560 that includes the parameters received from the local OP 506. Specifically, the parameters may include the signature indicating that the user has been locally authenticated by the local OP 506. RP 508 may verify the signature at 562 using the stored association handle A. At 564, RP 508 may identify the user 502 and allow user 502 to access services via RP 508. RP 508 may send an indication to user 502 indicating that the user 502 is logged in at RP 508. For example, at 566 RP 508 may display a page (e.g., an HTML page) at browser 504 that indicates that to the user 502 at 568 that user 502 is logged in. After logging in to RP 508, user 502 may access services via the RP 508.

Figure 6B:
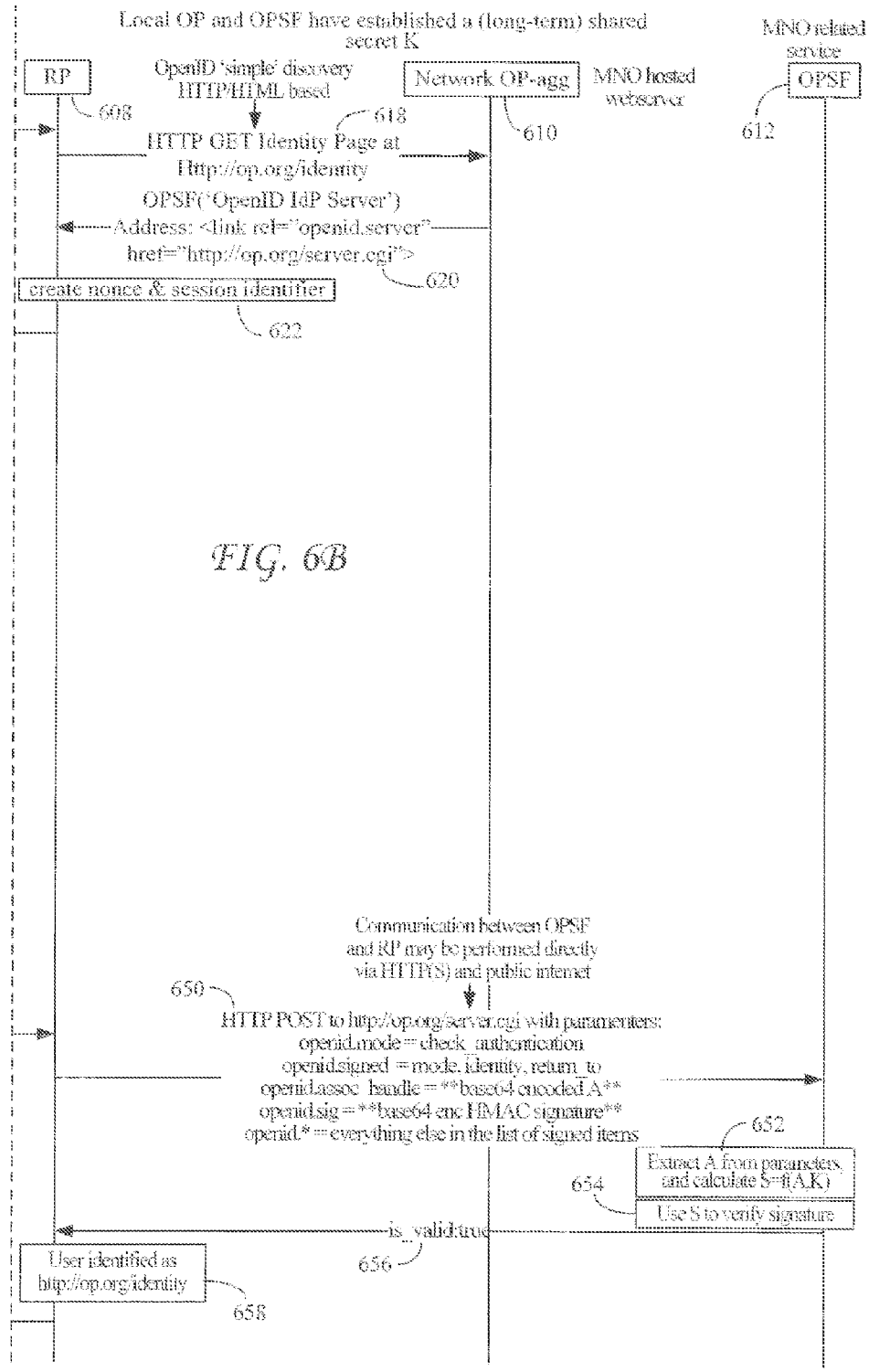

FIGS. 6A and 6B illustrate another example embodiment of a protocol flow using local authentication. As illustrated in FIGS. 6A and 6B, the air network traffic may be reduced by offloading traffic to the local device. For example, authentication traffic between the user 602, browser 604, and/or local OP 606 may be local and may not put a burden on the air network or the network services. Additionally, discovery and/or association traffic between the RP 608, network OP-agg

610, and/or OpenID IdP Server (OPSF) 612 may not occur via air network and may occur over other infrastructures, such as fixed line public internet for example. Other traffic illustrated in FIGS. 6A and 6B may take place over an air network for example.

The entities illustrated in FIGS. 6A and 6B include a user 602, a browser 604, a local OP 606, an RP 608, a network OP-agg 610, and an OpenID IdP Server (OPSF) 612. User 602 may include a wireless device, such as a WTRU for example, a user associated with the wireless device, and/or an application being executed on the wireless device. Browser 604 may include a web browser or other application being executed on the wireless device. The local OP 606 may be an entity residing locally on the wireless device that acts as a proxy for an OP residing outside of the wireless device, such as the network OP-agg 610 for example. The local OP 606 may be associated with a SCWS residing on the wireless device. Network OP-agg 610 is an OP that is external to the wireless device on which the local OP resides. For example, network OP-agg 610 may be an OP associated with an MNO, such as an MNO hosted web server for example. OPSF 612 may also be associated with an MNO, such as an MNO related service for example.

As illustrated in FIGS. 6A and 6B, at 614, user 602 may visit a website associated with RP 608 using browser 604. At 616, browser 604 may send a message to RP 608 containing an identity (e.g., OpenID identity URL). The message may be an HTTP message, for example. RP 608 may send a discovery message (e.g., HTTP GET IdentityPage message) at 618 to network OP-agg 610. In response RP 608 may receive an OPSF address at 620. At 622 RP 608 may create a nonce and/or a session identifier. RP 608 may send a redirect message (e.g., HTTP redirect message) to browser 604 at 624. The redirect message at 624 may include parameters that include the nonce and/or session identifier created at 622.

User 602, browser 604, and local OP 606 may perform local authentication at a device capable of communicating with a network, such as a WTRU for example. At 626, browser 604 may perform a local DNS lookup. For example, the DNS lookup may be used to find the local OP 606. The local DNS lookup may be performed as described herein for example. Browser 604 may send a message (e.g., HTTP GET message) to local OP 606 at 628 that includes the parameter set received from RP 608. At 630, local OP 606 may send an authentication page to browser 604, which may be displayed to user 602. User 602 may enter authentication information (e.g., authentication credentials) at 632 and the browser 604 may receive the authentication information (e.g., authentication credentials) at 634. Browser 604 may send the authentication information (e.g., authentication credentials) to the local OP 606 at 636. At 638, local OP 606 may verify the authentication information (e.g., authentication credentials). The local OP 606 may generate a unique, random association handle A at 640. The function f may be a simple function, as S may not be shared with RP 606 or user 602. At 642, local OP 606 may calculate a signature key S (e.g., Kasc) based on a function of association handle A and a long term shared secret or session key K (e.g., Krp) that is associated with OPSF 612. Knowledge of association handle A and/or signature key S may not expose session key K. Local OP 606 may calculate a signature using the signature key S (e.g., Kasc) at 644. The signature may also be included on an identity assertion at 644. Local OP 606 may send a redirect message (e.g., HTTP redirect message) to browser 604 at 646. The redirect message may include parameters that include the signature calculated by the local OP 606 at 644 and/or the identity assertion.

Browser 604 may send a message (e.g., HTTP GET message) to RP 608 at 648 that may include the parameters received from the local OP 606. For example, the parameters may include the signature calculated by the local OP 606 and/or the identity assertion. RP 608 may communicate directly with OPSF 612. For example, RP 608 may send an association message (e.g. POST message) to OPSF 612 at 650. The message at 650 may be sent via HTTP(S) and/or public internet for example. The association message may also include the parameters including the signature calculated by the local OP 606. OPSF 612 may extract association handle A from the parameters and calculate signature key S (e.g., Kasc) at 652. At 654, OPSF 612 may use the calculated signature key S (e.g., Kasc) to verify the signature calculated by local OP 606. At 656, the OPSF 612 may indicate to RP 608 that the signature is valid. RP 608 may determine that the identity of user 602 is valid at 658 and display a page (e.g., and HTML page) on the browser 604 at 660. The browser 604 may indicate to the user 602 that the user is logged in at the RP 608 at 662.

In an example embodiment, keys generated in the provisioning phase and/or authentication phase described herein may be bound to the network authentication. For example, the keys generated in the provisioning phase and/or authentication phase may be derived from network authentication keys. According to one embodiment, a local identity assertion provided by a local OP may be extended to blend in with authentication and key agreement protocols. For example, OpenID/GBA may be used in a provisioning phase to establish a long-term secret in one protocol embodiment. In another example embodiment, a protocol may be integrated with other authentication protocols which may result in a key being established in a device (or security module, such as a smartcard for example) and network, such that it may be used by the local OP (e.g., on a security module and/or device). This may be the key from the original authentication or key agreement protocol or a key derived from such keys. Such protocols may include AKA, IMS based authentication, and/or other authentication and key agreement protocols for example.

The authentication and key agreement protocols may take place in a security module, such as UICC, USIM, or smartcard based and/or ME/terminal based environment for example. The protocol flow may include an initial provisioning phase and/or an authentication phase, where the provisioning may take place once within a given time period, while the authentication phase may be used for each subsequent authentication while the key(s) derived from the provisioning phase are valid.

In one example embodiment, a message flow may be executed as a provisioning phase when a user logs on to an RP, such as the first time a user logs on to the RP for example. For example, a Browser Agent (BA) may send a user-supplied identifier to the RP. The user-supplied identifier may be normalized. For example, the user-supplied identifier may be normalized as described in Appendix A.1 of the OpenID specification (TR 33.924). The RP may retrieve the address of the OpenID Provider (OP) and may perform a discovery of an OP Endpoint URL (based on the user-supplied identifier) that the end user may wish to use for authentication. The RP and the network OP may establish a shared secret (e.g., association). According to one example, the shared secret may be established using the Diffie-Hellman Key Exchange Protocol. This shared secret may, for example, enable the network OP to secure and/or verify subsequent messages.

The RP may redirect the BA to the OP with an OpenID Authentication Request, such as the OpenID Authentication requested described in chapter 9 in the OpenID specification for example. Following this redirection, the BA may send a request (e.g., HTTP GET request) to a network OP/NAF. The request (e.g., HTTP GET request) may contain an indication of a local assertion. This may be done, for example, to indicate to the network OP/NAF that local identity assertion may be supported. In another example embodiment, the BA may avoid sending the request (e.g., HTTP GET request) when the OP/NAF decides on use of local identity assertion based on the user supplied identifier.

The NAF may initiate the UE authentication and may respond with a challenge requesting the UE to use Digest Authentication with GBA. For example, the NAF may initiate the UE authentication and may respond with an HTTPS response code 401 "Unauthorized", which may contain a header (e.g., WWW Authenticate header) carrying a challenge requesting the UE to use Digest Authentication with GBA. In one example embodiment, Digest Authentication with GBA may occur as specified in TS 33.222 with server side certificates. If no valid Ks is available, then the UE may bootstrap with the BSF, which may result in the possession of the UE of a valid network key Ks. From this the UE may derive the application specific, such as an OpenID specific, temporary keys (e.g., Ks_(ext/int)_NAF key(s)). In one example embodiment, the UE may bootstrap with the BSF as described in TS 33.220.

If no valid RP specific session key (e.g., Krp) is available, the UE may derive a session key (e.g., Krp) from the temporary key (e.g., Ks_(ext/int)_NAF key), which may result in possession of a valid RP-specific session key (e.g., Krp) by the UE. In one example embodiment, the temporary key (e.g., Ks_(ext/int)_NAF key) may be an OpenID specific temporary key (e.g., Ks_(ext/int)_NAF key). The derived session key (e.g., Krp) may be security-critical, as well as the key derivation process. For example, if someone could 'underive' the session key (e.g., Krp) from a signature key (e.g., Kasc), and then the authentication scheme would be broken for that particular OP-UE trust relationship. Therefore, a security provision may be implemented, such as a provision that the derived session key (e.g., Krp) may not yield any information about the used Ks from which it was derived. Additionally, an implicit implementation may be used to keep and use the session key (e.g., Krp) in a secured execution environment (SEE), such as UICC or TrE for example.

The UE may generate a request (e.g., an HTTP GET request) to the NAF. The request may carry an authorization header containing the bootstrapping transaction identifier (B-TID) received from the BSF. In one example embodiment, if GBA push is used, the B-TID may not be received from the BSF, but part of the GPI may contain the P-TID that may be used instead of the B-TID. Using the B-TID and NAF_ID the NAF may retrieve the shared application specific NAF key and optionally the USS (if GBA_U i.e. the temporary keys (e.g., Ks_int/ext_NAFs) are used then the GUSS may be supported) from the BSF over the web service based Zn reference point. In one example embodiment, this may be performed in accordance with TS 29.109 directed to Generic Authentication Architecture (GAA) and Zh and Zn interfaces based on the Diameter protocol. Additionally, the NAF may store the B-TID, the cryptographic keys and the user supplied identifier to allow matching of the OpenID user session and the GBA session. According to one example embodiment, since the OpenID may be HTTP(S) based, the NAF/OpenID server support for the interworking scenario the Web Service based Zn reference point may be as specified in TS 29.109. For example, it may support the Diameter based implementation of the Zn reference point. If no valid RP specific session key (e.g., Krp) is available, the NAF may derive session key (e.g., Krp) from the OpenID specific temporary key (e.g., Ks_(ext/int)_NAF key), which may result in possession of the same valid RP-specific session key (e.g., Krp) by the NAF, as by the UE described herein. The same implementation on KDF may apply as described herein.

NAF/OP may authenticate the user for OpenID. The NAF may redirect the browser to the return OpenID address. For example, the OP may redirect the ME's browser back to the RP with either an assertion that authentication is approved or a message that authentication failed. The response header may contain a number of fields defining the authentication assertion that may be protected by a shared secret between OP and RP. The protection may be if the OP and the RP do not reside both in the same MNO network. The NAF may respond with a 200 OK message. In one example embodiment, the NAF/OP may authenticate the user using TS 33.222 section 5.3 directed to Generic Authentication Architecture (GAA) and Access to Network Application Functions using HTTPS.

The RP may validate the assertion. For example, the RP may check if the authentication was approved. The authenticated identity of the user may be provided in the response message towards the RP. If a shared secret (association) was established as described herein, then it may be used to verify the message from the OP. If the validation of the assertion and the verification of the message (if the shared secret was used) are successful, then the user may be logged in to the service of the RP.

In an example embodiment, when an operator deploys GBA push rather than GBA, the MNO may wish to establish a shared secret. For example, embodiments described herein may be replaced by the GBA credential push message and the protocol may continue as described herein. In an example embodiment, the shared secret may be established as described in U.S. Non-provisional application Ser. No. 13/023,985, filed Feb. 9, 2011, entitled Method and Apparatus for Trusted Federated Identity.

Figure 7:
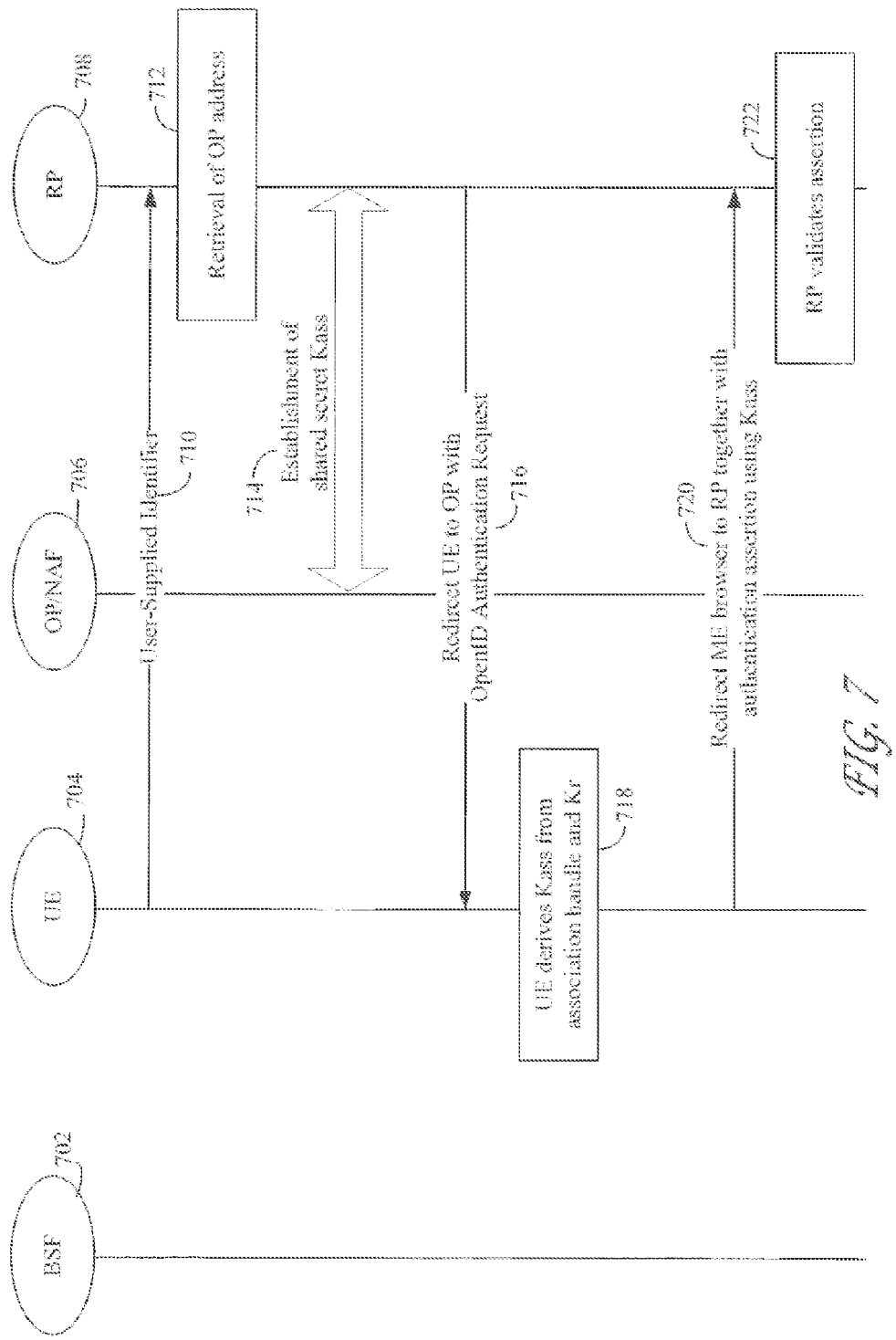
FIG. 7 illustrates an example embodiment of a flow of operations for an authentication phase.

FIG. 7 illustrates an example embodiment of a flow of operations for an authentication phase with local identity assertion. In one example embodiment, the message flow illustrated in FIG. 7 may be executed when the user logs onto an RP, such as when the user logs on for a first time for example. The entities illustrated in FIG. 7 include BSF 702, UE 704, network OP/NAF 706, and RP 708. UE 704 may include a browser agent (BA) and/or other applications capable of communicating with RP 708.

As illustrated in FIG. 7, UE 704 may send a user-supplied identifier to RP 708 at 710. The user-supplied identifier may be normalized. In one example embodiment, the user-supplied identifier may be normalized as described in Appendix A.1 of the OpenID specification. At 712, the RP 708 may retrieve the address of the OpenID Provider (OP) 706. The RP 708 may also perform a discovery of the OP Endpoint URL, based on the user-supplied identifier, that the end user may wish to use for authentication. At 714, the RP 708 and the OP/NAF 706 may establish an association. For example, the association may be established as described in chapter 8 of the OpenID specification. The association may be identified by a unique association handle and shared session key generated by the OP/NAF 706. The OP/NAF 706 may derive a shared signature key (e.g., Kasc) from the session key (e.g., Krp) and the association handle. The signature key (e.g., Kasc) may follow a specification. For example the signature key may follow the specification for OpenID MAC signature keys. For example, Kasc may be a valid key for HMAC-SHA1 or HMAC-SHA256, as specified in chapter 6 in ETSI TS 102 127 directed to smart cards and transport protocol for CAT applications. The key signature key (e.g., Kasc) and the association handle may be communicated to RP 708 at 714.

When OpenID is used, association may be used to establish a shared secret signature key between the OP/NAF 706 and the RP 708 for the signature and signature verification process. This shared secret signature key may be a valid key for HMAC-SHA1 or HMAC-SHA256 as specified in OpenID for example. In one example embodiment, a protocol other than the Diffie-Hellman Key Exchange Protocol may be used to establish a secret. For example, the secret may depend on protocols other than the Diffie-Hellman Key Exchange Protocol and may be derived from protocols other than the Diffie-Hellman key exchange. The keys established in the Diffie-Hellman process may be used to encrypt the shared secret when it is communicated from the OP/NAF 706 to the RP 708. For example, the shared secret may be encrypted using the Diffie-Hellman process when the OP/NAF 706 generates the shared secret. In another example embodiment, the shared secret may be sent in plain text when the TLS between the RP 708 and OP/NAF 706 secures the communication.

The signature key (e.g., Kasc) may be established as the shared secret, and may be derived from the association handle and the session key (e.g., Krp). This may be accomplished using any suitable algorithm known in the art. Additionally, the OP/NAF 706 may create the association handle and may choose a unique and random association handle. The derived signature key (e.g., Kasc) and the key derivation process may be security-critical. For example, if someone could 'underive' the session key (e.g., Krp) from a signature key (e.g., Kasc), then the authentication scheme may be broken for that particular UE-RP trust relationship. A security provision may be implemented, such as a provision that the derived signature key (e.g., Kasc) may not yield any information about the used session key (e.g., Krp) from which it was derived for example.

At 716, the RP 708 may redirect UE 704 to the OP/NAF 706 with an authentication request (e.g., OpenID authentication request). For example, the RP 708 may use the OpenID authentication request defined in chapter 9 in the OpenID specification. At 718, the UE 704 may derive the same association specific signature key (e.g., Kasc) as established between OP/NAF 706 and RP 708 at 714. The association specific signature key (e.g., Kasc) may be derived from session key (e.g., Krp) and the association handle contained in the authentication request. In one example embodiment, it may be an implicit implementation to keep and use the signature key (e.g., Kasc) in a security entity, such as a SEE, UICC, or a TrE for example. The security risk may be lower for the signature key (e.g., Kasc) than for the session key (e.g., Krp), since the signature key (e.g., Kasc) may be used for one authentication for example.

At 720, the UE 704 may redirect the browser to the return address (e.g., OpenID address) at the RP 708 with an assertion that authentication may be approved. The response may include parameters defining the authentication assertion that may be protected by the shared secret signature key (e.g., Kasc). For example, the response header may contain a number of fields defining the authentication assertion that may be protected by the shared secret signature key (e.g., Kasc). The RP 708 may validate the identity assertion at 722 using the signature key (e.g., Kasc). For example, the RP 708 may check if the authentication was approved by checking the signature in the corresponding fields of the assertion message. The authenticated identity of the user may be provided in the response message towards the RP 708. If the validation of the assertion and the verification of the message are successful, then the user may be logged in to the service of the RP 708.

As described herein, in some example embodiments, the local identity assertion provider, such as the local OP, may be integrated with different key agreement and authentication protocols.

Figure 8:
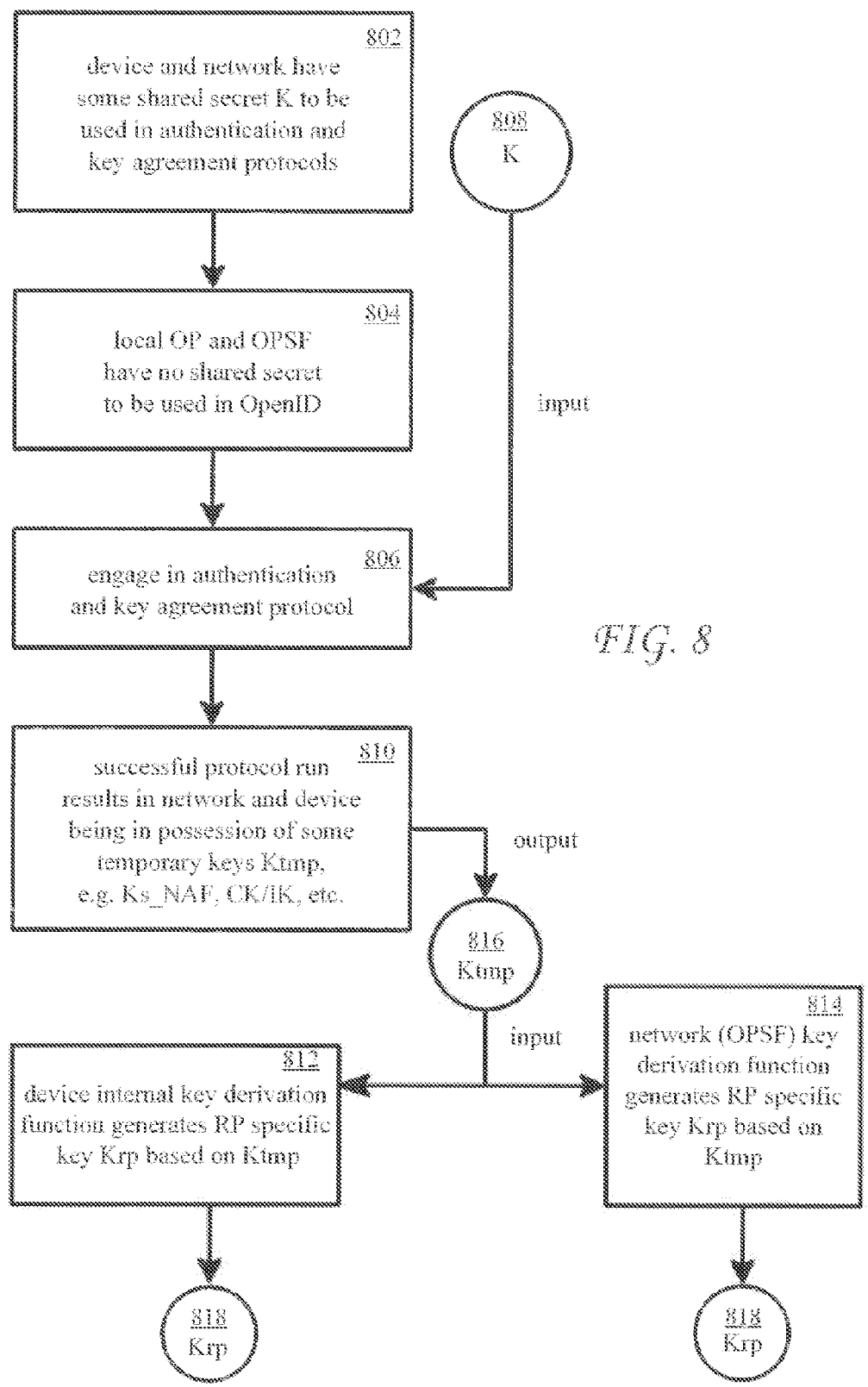
FIG. 8 illustrates an example embodiment of a flow of operations for a provisioning phase.

FIG. 8 illustrates an example embodiment of a flow of operations for a provisioning phase. In one example embodiment, the provisioning phase may be performed once within a given time period, while the authentication phase may be used for each subsequent local authentication while the key(s) derived from the provisioning phase are valid. Before the provisioning phase may be initiated, no shared secret (e.g., for OpenID) may be established between the network and the local OP. After the provisioning phase, the local OP and the network (e.g., OPSF) may be in possession of a long-term shared secret, such as the secret denoted as RP-specific session key (e.g., Krp), for example.

As illustrated in FIG. 8, at 802, a device and a network may have a shared secret key K 808 to be used in authentication and key agreement protocols between the device and the network. As illustrated at 804, a local OP at the device and an OPSF at the network may have no shared secret to be used in OpenID. At 806, the device and the network may engage in an authentication and key agreement protocol using shared secret K 808. After a successful protocol run, the network and the device may be in possession of temporary keys Ktmp 816 (e.g., Ks_NAF, CK/IK, etc.) at 810. At 812, the device may perform an internal key derivation function that generates an RP-specific session key (e.g., Krp) 818. At 814, the network (e.g., OPSF) key derivation function may also generate the RP-specific session key (e.g., Krp) 818. The session key (e.g., Krp) 818 may be generated, both at the device and the network for example, based on the temporary key (e.g., Ktmp) 816.

Figure 9:
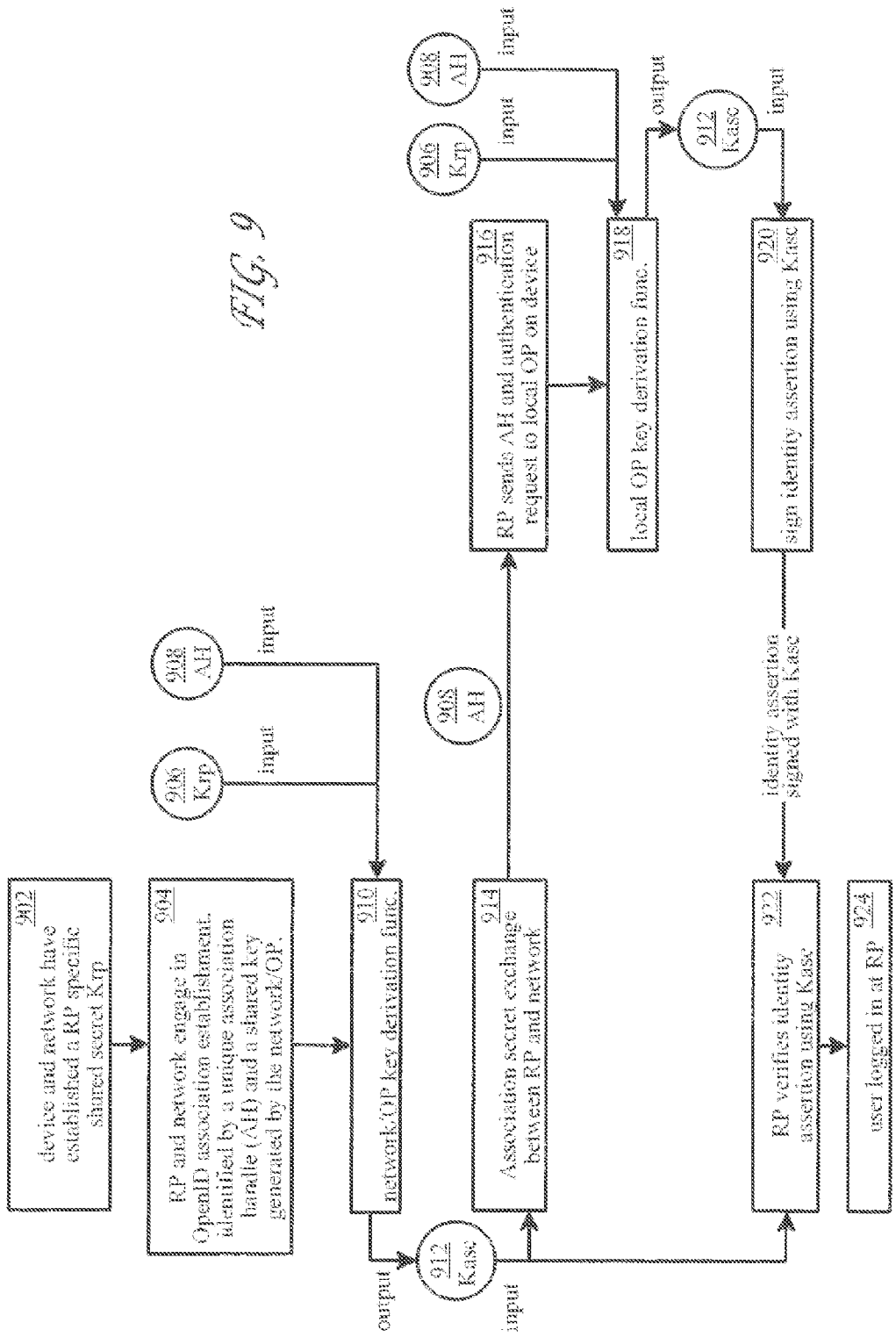
FIG. 9 illustrates another example embodiment of a flow of operations for an authentication phase.

FIG. 9 illustrates another example embodiment of a flow of operations for an authentication phase. In one example embodiment, the authentication phase may be performed if a secret session key (e.g., Krp) has been established between network and device. Based on a RP specific secret session key (e.g., Krp), shared between the network (e.g., OPSF) and device, a signature and/or association specific secret or key (e.g., Kasc) may be generated and/or used by the local OP to sign the identity assertion.

As shown in FIG. 9, any temporary key Ktmp (e.g., Ks_(int/ext)_NAF) which may be the output of a key agreement protocol may be used to derive the keys, such as the session key (e.g., Krp) and the signature key (e.g., Kasc), that may be used for authentication (e.g., OpenID authentication).

As illustrated in FIG. 9, at 902, a device and a network may have established an RP specific shared session key (e.g., Krp), as illustrated in FIG. 8 for example. At 904, the RP and the network may engage in an association establishment (e.g., an OpenID association establishment), identified by a unique association handle and a shared key generated by a network and/or a network OP. The network and/or network OP may use a key derivation function at 910 to derive a signature key (e.g., Kasc) 912 that may be used for authentication. For example, the key derivation function may use the session key (e.g., Krp) 906 and association handle 908 to derive the signature key (e.g., Kasc) 912.

The signature key (e.g., Kasc) may be used in an association secret exchange between an RP and a network at 914. The RP may send the association handle 908 and an authentication request to a local OP on the device at 916. The local OP may derive the signature key (e.g., Kasc) 912 from a function using the session key (e.g., Krp) 906 and association handle 908 at 918. At 920, the local OP may sign an identity assertion using the signature key (e.g., Kasc) 912. The signed identity assertion may be an identity assertion received from a user, such as via a browser for example. The RP may verify the identity assertion signed by the local OP with the signature key (e.g., Kasc) at 922 using the signature key (e.g., Kasc) 912 derived by the network and/or network OP. At 924, a user may be logged in to services at the RP.

In one example embodiment, AKA may be integrated by using the CK/IK which may be established in the device (and/or smartcard) and network after a successful AKA run. The established AKA keys may be provided to a local OP on the device (e.g., on the device's security module or smartcard) by deriving the session key (e.g., Krp) from the CK/IK using an appropriate key derivation function. The CK/IK may be an input to the key derivation function, similar to the temporary key Ktmp (e.g., Ks_(ext/int)_NAF) as shown in FIG. 8. This may result in the network (e.g., OPSF) and the device (e.g., local OP) being in possession of the same session key (e.g., Krp) for an RP. Once the session key is established, it may be used as depicted in FIG. 9. Additionally, other protocols may be used such as IMS based authentication methods or other authentication and key agreement protocols for example.

The terms smartcard (SC) or security module as used herein describe any trusted environment on a device, such as an Integrated Circuit Card (ICC) or USIM for example, that may provide a set of secure operation facilities. According to one embodiment, the UICC may be the location where the SC is used to hold network authentication credentials (e.g. GSM/UMTS) used in mobile devices. The Smart Card Webserver (SCWS) application may be an SCWS as defined by Open Mobile Alliance (OMA) for example. The SCWS is not limited to the use in UICCs and may be available on any other smartcard, depending on the card issuer's preference for example. Local user authentication using OpenID, with the OP entity residing inside a secure element, may be extended to any other SC, such as a general SC for example.

Additionally, any other secure environment that may provide similar interfaces and/or protected execution for security critical embodiments, may be an implementation target for the embodiments described herein.

Based on the assessment that the use of the SCWS and therefore the embodiments for user authentication may use UICCs, additional embodiments for stakeholder models may be identified.

In an example embodiment, the MNO may act as the full identity provider. The MNO may host the OP-agg, OPSF discovery, and/or association point entities as web services. Additionally, the MNO may also provide the OP application to the UICC along with the user identity.

In an example embodiment, a user may have an existing OpenID identifier registered with a third party OP, such as myopenid.com for example. The MNO may no longer act as service provider towards the user. The MNO may transport data and may allow the third party OP to install the OP application on the UICC and/or associate it with the SCWS application. The third party OP may establish a business relationship with the MNO. The MNO may also grant the third party OP remote administration rights for the OP application. The MNO may charge the third party OP for that service and generate revenue.

In another example embodiment, which is described further herein, the third party OP and/or MNO may interact with GlobalPlatform (GP) compliant smartcards.

In an example embodiment, the concepts described herein may be implemented in a non-mobile scenario, such as a SC that may be issued by a bank for example. The SC may be used by an OpenID identity provider to install the OP application. For example, a banking card may host an NFC-ticketing application and/or an OpenID authentication OP application. In such a non-mobile scenario, there may be no prior knowledge about the type of device that the SC may communicate with. It may be possible to establish TCP/IP over USB connections to an SC, via a local link, SC-reader, NFC communication interface, or the like. The SC may be equipped with a SCWS, that may be reachable by an external terminal for example.

According to an embodiment, the device may contain the SC hosting the SCWS. OP applications that want to access the RP website may not be on the same device. According to this embodiment, the SC may be used as an external authentication token. These split terminal cases may be combined with the different stakeholder models described herein.

In an example embodiment, a user may own a mobile device, equipped with a UICC, with SCWS and local OP installed. The user may use a Browsing Agent (BA), that may be a device different from the mobile device, to access the desired webpage at the RP. When the BA visits the RP and submits an identifier (e.g., a local OpenID identifier) to log in, the RP may redirect the BA to the local OP. For example, the RP may redirect the BA to the URL of the local OP. As described herein, the redirect message (e.g., HTTP redirect message) from the RP to the BA may contain the information that may be used for the local OP application to calculate the signature on the assertion message. The contents of this message may be conveyed to the mobile device and/or the local OP on the SC. The local OP may display the authentication page to the user on the mobile device and the user may authorize and/or authenticate the login. The local OP may sign the identity assertion message. The signed identity assertion message may be sent back to the RP, which may alternatively be done by the BA. The RP may verify the signature and the user/BA may be logged in at the RP.

In an example embodiment, it may be possible for the BA to establish a local link, such as a link via Bluetooth or WLAN for example, to the mobile device and may register the device as the one which hosts the OP. The browser may send a redirect to the mobile device via the local link which may forward it to the local OP and/or SCWS. The local OP may ask the user for user credentials. The user may authenticate towards the OP using the mobile device. The user may authenticate using a password, PIN, biometrics, and or any other form of authentication for example. The local OP may sign the assertion message and/or forwards it via the local link to the BA. The BA may use this message to authenticate towards the RP. In this embodiment, the BA may act as an MITM between the RP and the mobile device for example. As the user may know that the user initiated this OpenID session, the user may be able to detect unauthorized requests on the mobile device.

Figure 10:
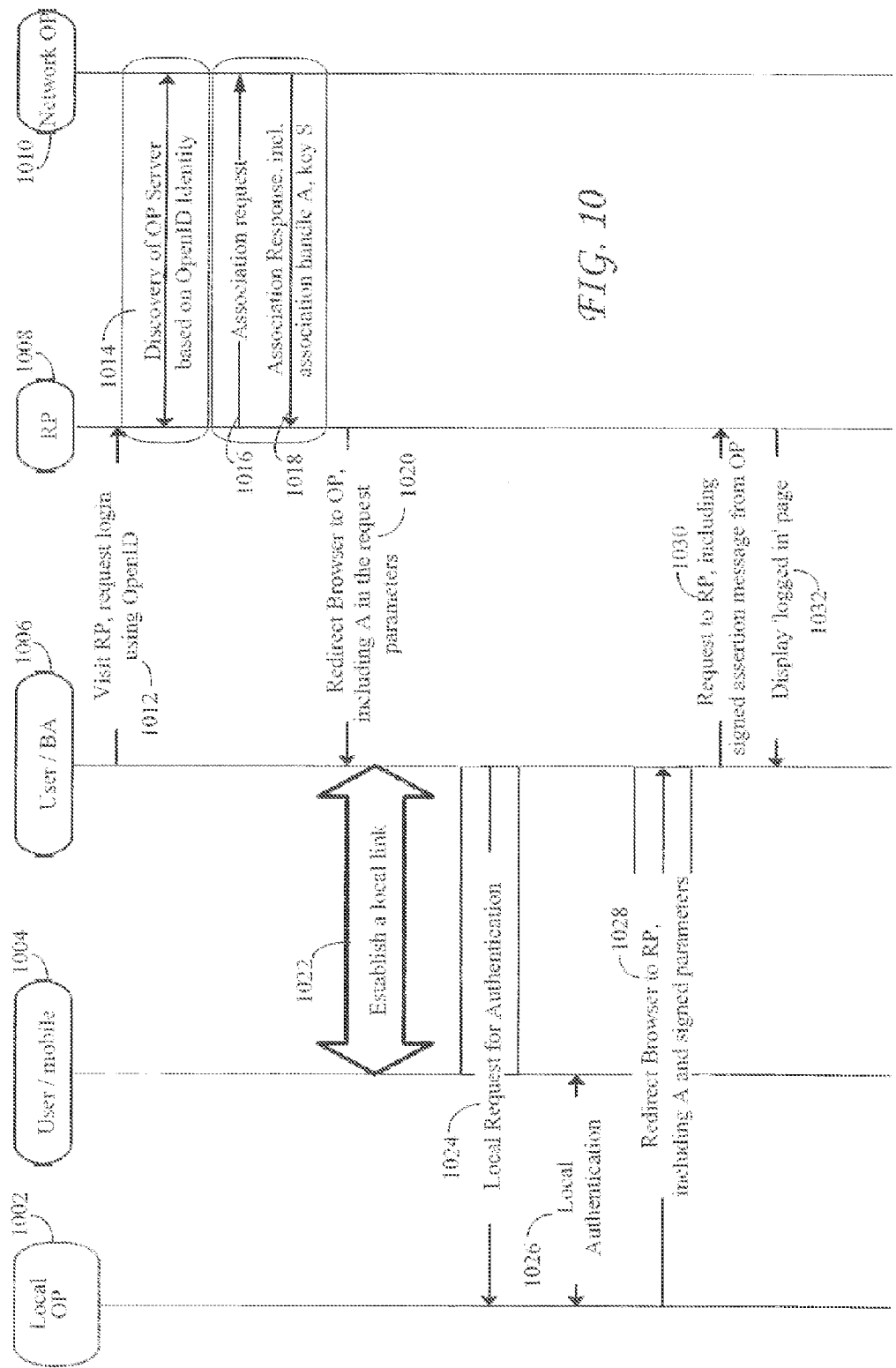
FIG. 10 illustrates an example embodiment of a protocol flow for a split terminal scenario.

FIG. 10 illustrates an example embodiment of a protocol flow for a split terminal scenario. As shown in FIG. 10, the communications between local OP 1002, user/mobile 1004 and/or user/BA 1006 may occur via a local link.

The entities illustrated in FIG. 10 include local OP 1002, user/mobile 1004, user/BA 1006, RP 1008, and network OP 1010. Local OP 1002 and user/mobile 1004 may be included on and/or association with the same wireless device, such as a WTRU for example. The local OP 1002 may be an entity residing locally on the wireless device or locally associated with the wireless device that acts as a proxy for a network OP residing outside of the wireless device, such as the network OP 1010 for example. The local OP 1002 may be associated with an SCWS residing on the wireless device. Network OP 1010 may be an OP that is external to the device on which the local OP 1002 resides or is locally associated. For example, network OP 1010 may be an OP associated with an MNO.

At 1012, user/BA 1006 may send a login request to RP 1008. According to one embodiment, the login request may be made using OpenID. At 1014, RP 1008 and network OP 1010 may perform discovery of an OP server on the network. The discovery may be performed based on OpenID identity for example. RP 1008 may send an association request to the network OP 1010 at 1016. The RP 1008 may receive an association response from the network OP 1010 at 1018. The association response may include an association handle A and/or a signature key S (e.g., Kasc). At 1020 the RP 1008 may send a redirect message to user/BA 1006. The redirect message may be configured to redirect the browser on the device to the local OP 1002. The redirect message may have parameters that include the association handle A.

At 1022, user/mobile 1004 may establish a local link with user/BA 1006. User/BA 1006 may send a local request for authentication to local OP 1002 at 1024. At 1026, local authentication may be performed between local OP 1002 and user/mobile 1004. For example, the local authentication may be performed as described herein. At 1028, local OP 1002 may send a redirect message to user/BA 1006. The redirect message may redirect the browser to the user/BA 1006. The redirect message may include association handle A and/or signed parameters. At 1030, user/BA 1006 may send a request to RP 1008. The request may be a request for services at RP 1008. The request may include the signed assertion from the local OP 1002. Based on the signed assertion message from local OP 1002, RP 1008 may indicate that the user is logged in to the RP 1008. For example, RP 1008 may display a logged in page at 1032.

In an example embodiment, a non-mobile SC may be used and/or issued to a web-based OP or another third party, such as a bank for example. When a non-mobile SC is used and/or issued, similar implementations may be applied as described herein. For example, a non-mobile SC may be implemented similar to the implementation of mobile split-terminal embodiments as described herein. For example, the establishment of the local link may be via an external smartcard reader and/or an NFC (Near-field-communication) terminal attached to a computer. The interface may support HTTP messages that may be sent to the OP/SCWS implemented on the SC.

In an example embodiment, the OP application may be implemented on any GlobalPlatform (GP) compliant SC, such as the UICC in GSM and/or UMTS networks for example, and may accommodate different stakeholder models. Some SCs may be GP enabled, but the implementations of GP SCs described herein may be mapped to implementation options for other embodiments, such as implementation on a Javacard for example.

GP SCs may host one or more security domains (SDs), whereby each SD may represent a stakeholder and/or may be able to store keys, install applications, and/or personalize applications for that stakeholder. The main SD may be the issuer SD that may belong to the card issuer. SDs may be organized in a hierarchy. SDs may have different privileges to manage content inside their hierarchy. The issuer SD may have Authorized Management (AM) privilege and may have autonomous control over the card and may be able to install and/or delete SDs in its hierarchy. Other SDs may be given AM if they reside in a separate hierarchy on the card. If the SD is in the same hierarchy, the SD may get Delegated Management (DM) privilege that may allow the SD to manage card content in its sub-hierarchy. All actions performed by this SD may be authorized by the issuer by tokens that may be presented to the Issuer SD (ISD) by the DM SD and may be checked by the ISD.

Applications in a GP SC that may reside in different SDs may be able to communicate using the concept of Trusted Path (TP). TP may be a privilege that may be assigned to the applications and may allow them to exchange commands via the GP Open API. Applications may otherwise be separated on a GP SC.

Figure 11:
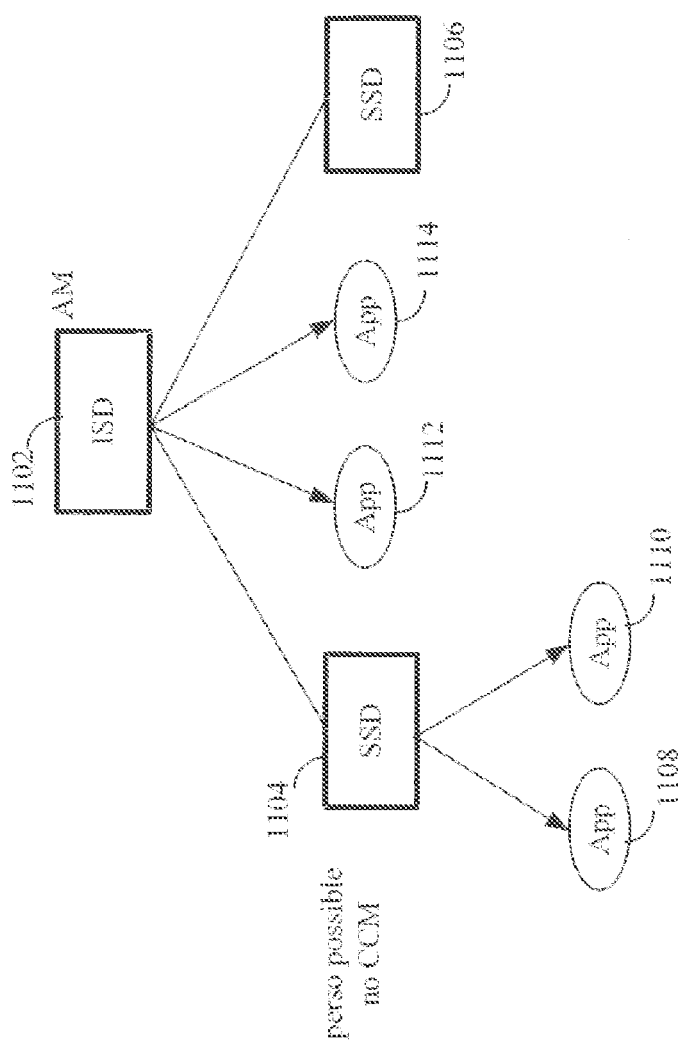
FIG. 11 illustrates an example embodiment of a security domain (SD) hierarchy.

FIG. 11 illustrates an example embodiment of a security domain (SD) hierarchy. The security domain hierarchy includes an Issuer Security Domain (ISD) 1102, Supplementary Security Domain (SSD) 1104, SSD 1106, and Applications (Apps) 1108, 1110, 1112, and 1114. ISD 1102 may have AM privilege and may have control over the other entities in the SD hierarchy. ISD 1102 may have control over Apps 1112 and 1114, while ISD 1102 may give DM privileges to SSD 1104 and SSD 1106. For example, SSD 1104 may have control over Apps 1108 and 1110.

Figure 12:
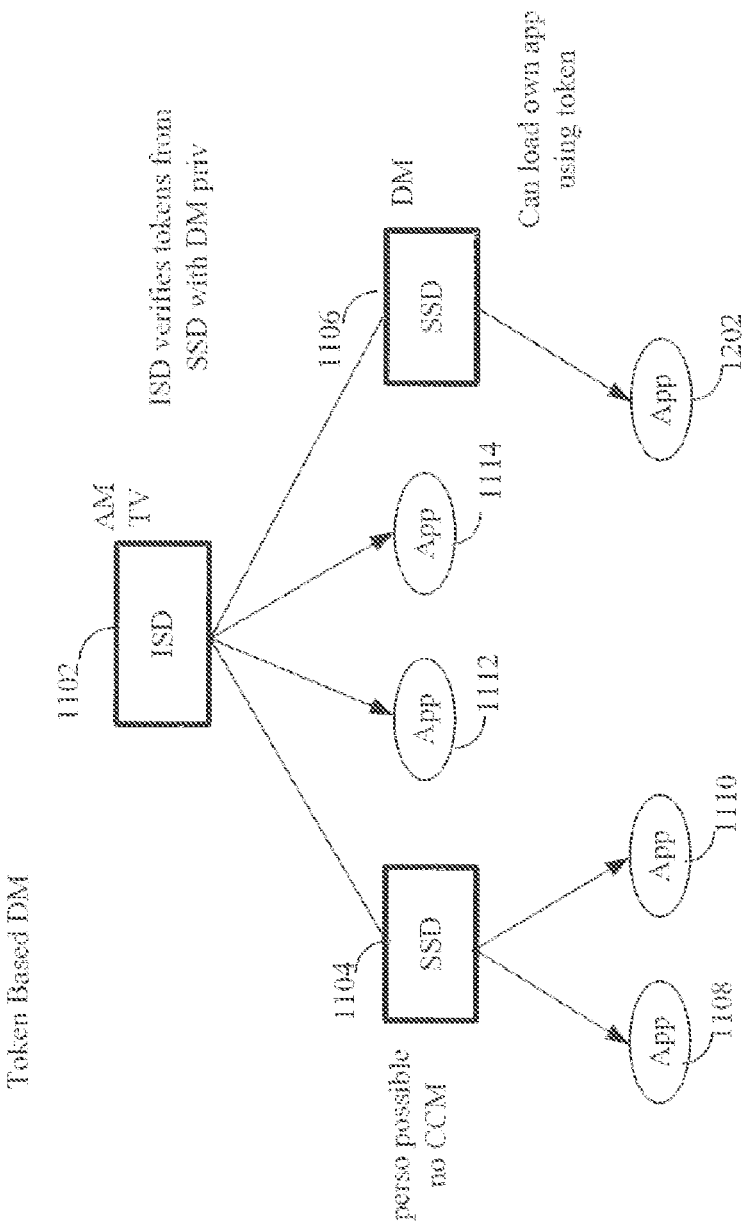
FIG. 12 illustrates another example embodiment of a security domain (SD) hierarchy.

FIG. 12 illustrates another example of a security domain (SD) hierarchy. The SD hierarchy may have a token based domain management. IDS 1102 may verify tokens from SSD 1104 and/or SSD 1106. This token-based management may enable SSD 1106 to load its own App 1202 using a token verified by ISD 1102. The token verification may be performed using the token- and/or key-based verification embodiments, or similar embodiments, described herein.

Depending on how the SCWS is implemented on the SC, different options may apply, enabling different stakeholder models.

Figure 13:
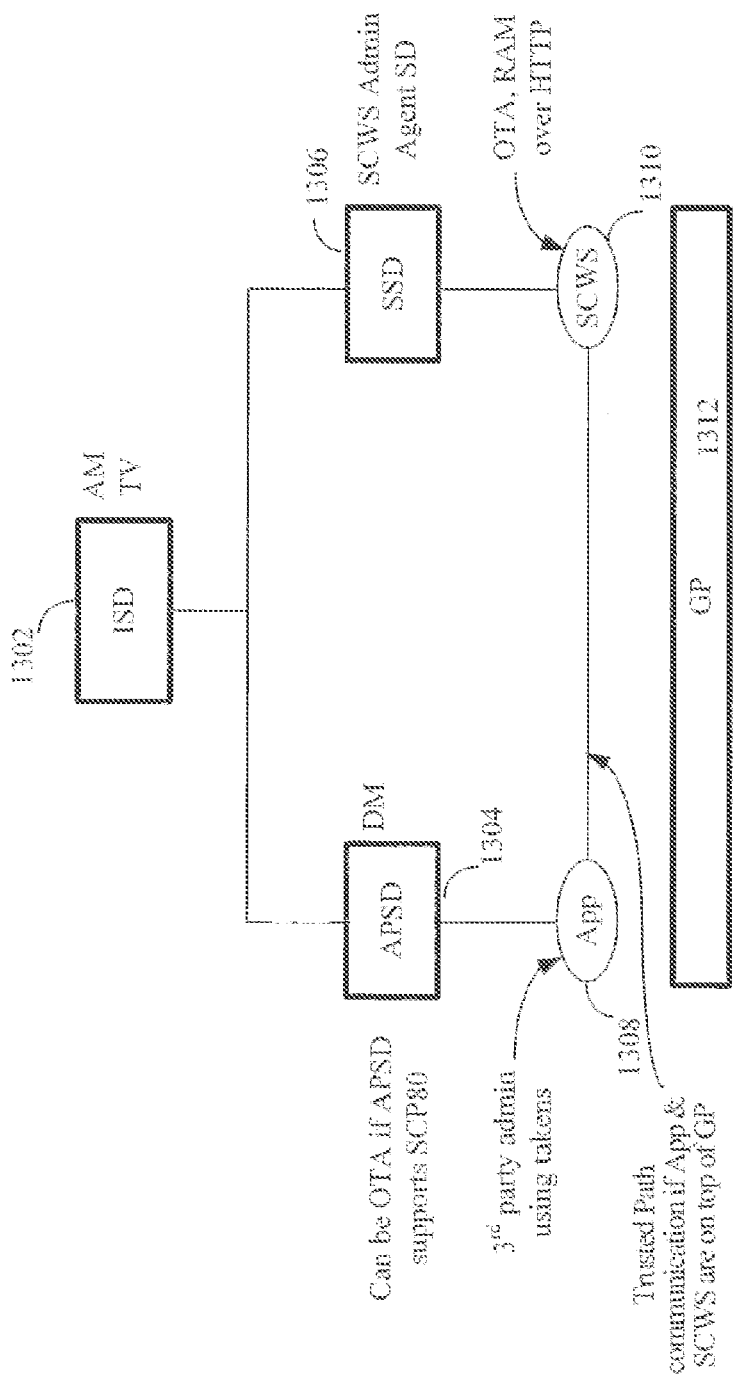
FIG. 13 illustrates an example embodiment of a security domain hierarchy using a smartcard web server (SCWS) as a GlobalPlatform (GP) application.

FIG. 13 illustrates an example embodiment of a domain hierarchy using a web server, such as a smart card web server (SCWS) 1310 for example, as a GlobalPlatform (GP) application. As illustrated in FIG. 13, the SCWS 1310 may be implemented as an application in an owned SD, such as ISD 1302 owned by a SC issuer for example. ISD 1302 may have Authorized Management (AM) privilege and may have autonomous control over the hierarchy illustrated in FIG. 13. Application provider (e.g., third party OP) SD (APSD) 1304 may be an SD for App 1308 and may have Delegated Management (DM) privilege to manage OP App 1308. SCWS admin agent SD (SSD) 1306 may be an SD for SCWS 1310 and may have DM privilege to manage SCWS 1310.

SCWS 1310 may be implemented as a GP application for GP 1312. The MNO model, the third party OP model, and/or the non-MNO model may be supported. The application logic of the OP may reside in a different SD, such as APSD 1304 for example. App 1308 may be owned and/or managed by APSD 1304, which may be a different entity than the SSD 1306 owning the SCWS application 1310 and domain. App 1308 and SCWS 1310 may communicate using TrustedPath capabilities. The third party and the card issuer may have to agree on a business relationship to perform this implementation. For example, the third party and the card issuer may have to grant the right privileges to the SDs and applications.

SCWS management may be performed by the card issuer via the SSD 1306, which may support OTA management capabilities, such as RAM over HTTP for example. If the APSD 1304 also supports the SCP80 protocol, the application and content may be managed OTA by the third party, using DM tokens.

Figure 14:
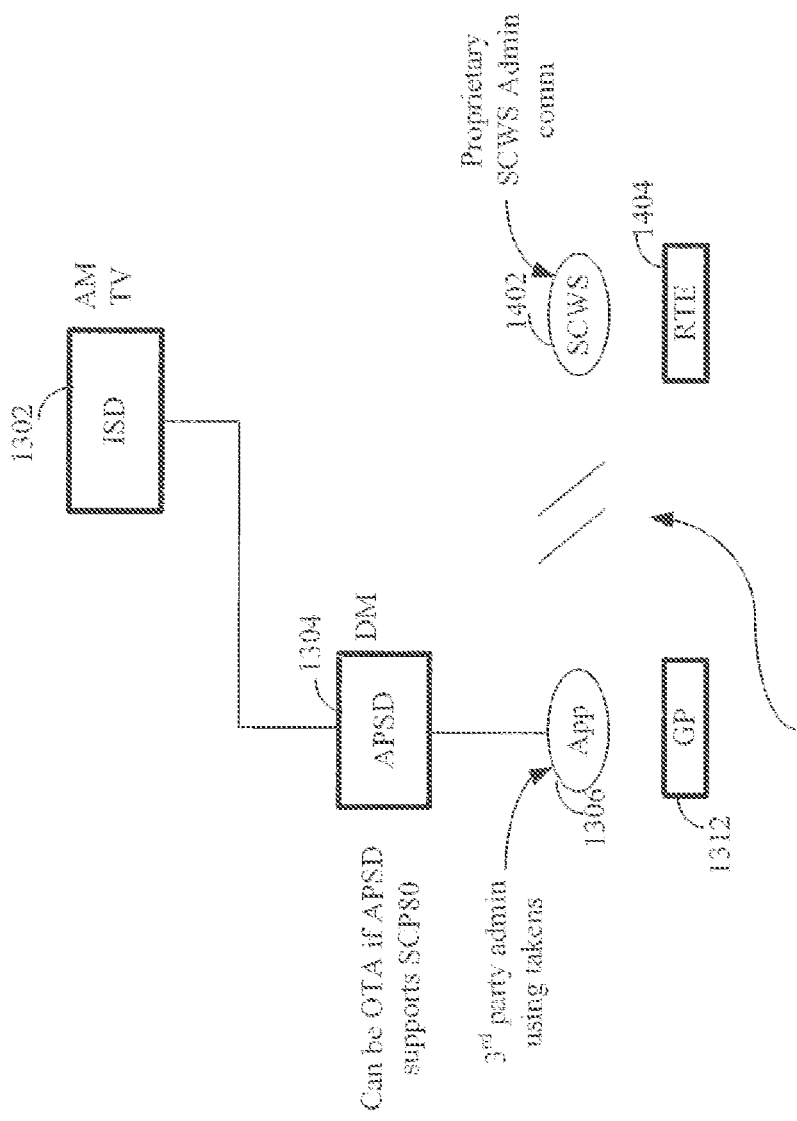
FIG. 14 illustrates an example embodiment in which a SCWS may be implemented in the run time environment (RTE) of a card.

FIG. 14 illustrates an example embodiment in which a SCWS may be implemented in the run time environment (RTE) of a card. If the SCWS is implemented in the runtime environment (RTE) of the card, such as by the SC manufacturer for example, there may not be a way for a third party application to communicate with the SCWS, as the access to the SCWS may not be exposed through the GP framework. Hence, the stakeholder model of a third party OP may not be supported. However, the MNO and the non-mobile model may be supported.

As illustrated in FIG. 14, there may be no OTA communication between App 1306 and SCWS 1402, but GP API and/or GP OPEN may not specify communication with underlying RTE components, such as RTE 1404 and/or SCWS 1402. If the APSD 1304 supports the SCP80 protocol, the application and content may be managed OTA by the third party, using DM tokens.

Figure 15B:
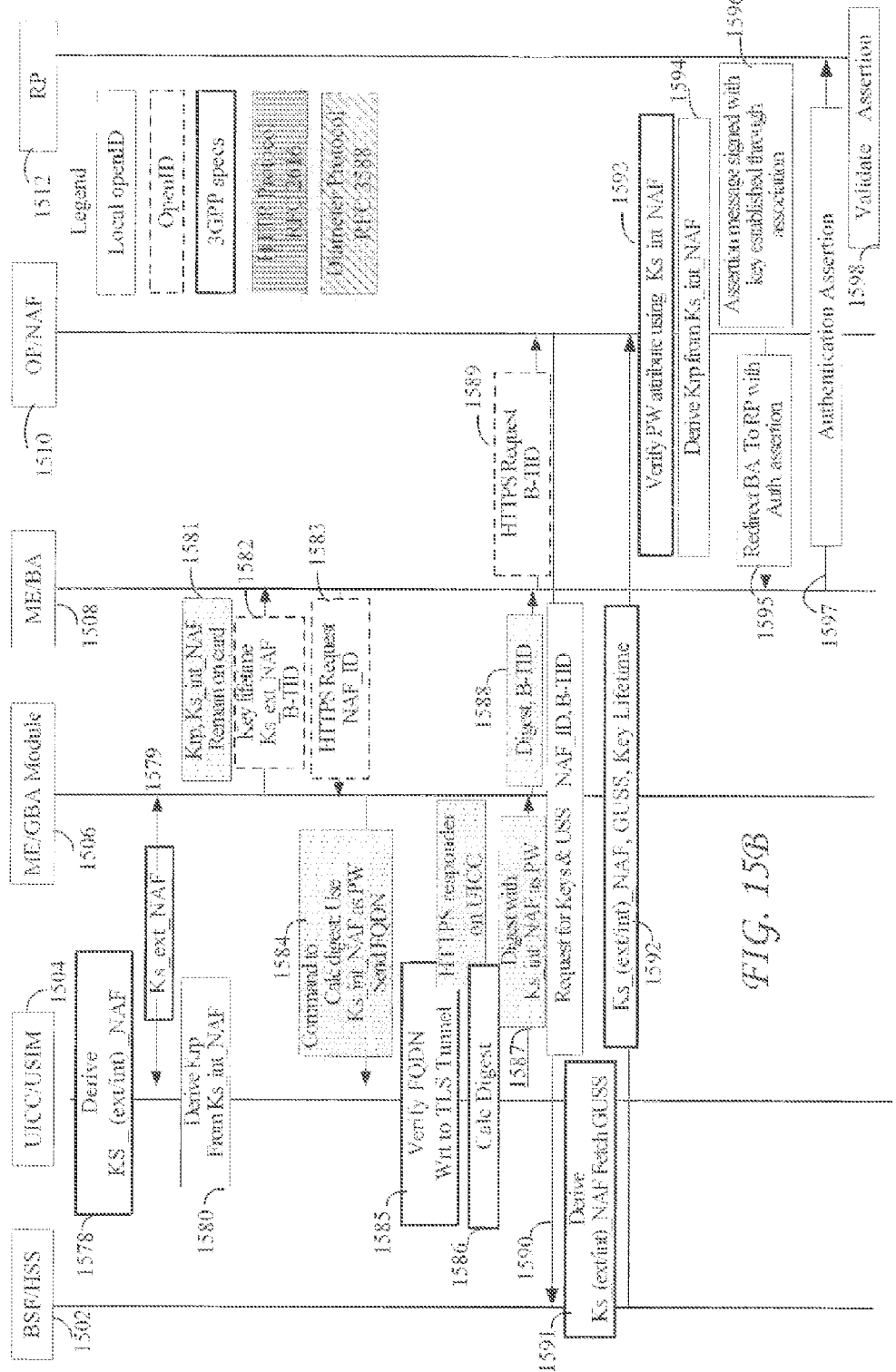

FIGS. 15A and 15B illustrate example embodiments of a protocol flow for a provisioning phase. The provisioning phase may be used for an SSO protocol for example. The provisioning illustrated in FIGS. 15A and 15B may be performed using GBA to derive a shared secret session key (e.g., Krp) between security module 1504 and OP/NAF 1510. The security module 1504 may comprise a smartcard, a USIM, a UICC, a Java card, a smartcard Webserver (SCWS) enabled SmartCard, or other trustworthy entity on a WTRU. According to an example embodiment, the security module 1504 may include a local OP and/or local web server, such as a SCWS for example, as described herein.

As illustrated in FIG. 15A, at 1514, ME/BA 1508 may log in with an OP identifier to RP 1512. RP 1512 may perform discovery at 1516 and establish an association with network OP/NAF 1510 at 1518. At 1520, RP 1512 may redirect ME/BA 1508 to network OP/NAF 1510. ME/BA 1508 may perform a detailed lookup and decision procedure with security module 1504 at 1522. At 1524, ME/BA 1508 may establish a TLS tunnel with OP/NAF 1510. At 1524, the OP/NAF 1510 may be a network entity that is authenticated at this point in the protocol. At 1526, ME/BA 1508 may send a request (e.g., an HTTP GET request) for an authentication page to network OP/NAF 1510. OP/NAF 1510 may send an authentication request to ME/BA 1508 at 1528. At 1530, ME/BA 1508 may send a request to ME/GBA module 1506 for app specific GAA keys. ME/GBA module 1506 may send an IMSI request to security module 1504 at 1532.

At 1534, security module 1504 may check for a valid temporary key Ks. This check may be performed after the IMSI request at 1532 for example. Security module 1504 determines at 1536 if a valid temporary key Ks is present. If a valid temporary key Ks is present, then bootstrapping may not be performed, and the message flow may skip to step 1580, at FIG. 15B, to derive a session key (e.g., Krp) from the temporary key Ks. If no valid temporary key Ks is present, then bootstrap may be performed as described herein to generate a valid temporary key.

According to one embodiment, bootstrapping may be performed as illustrated at steps 1538 to 1579 in FIGS. 15A and 15B. The bootstrapping may be performed to authenticate (e.g., user authentication) and derive a temporary key (e.g., Ks_(ext/int)_NAF) for use in performing local authentication. While steps 1538-1579 in FIGS. 15A and 15B illustrate one embodiment of a bootstrapping protocol, other bootstrapping and/or authentication protocols may be performed, for authentication and/or to generate a temporary key, according to embodiments known to a person of reasonable skill in the art.

As illustrated in FIG. 15B, using the bootstrapping procedure performed from steps 1538-1579 of FIGS. 15A and 15B, security module 1504 may derive a temporary key (e.g., Ks_(ext/int)_NAF) at 1578. The derivation uses a key derivation function which depends on Ks and/or other known parameters employed in the protocol. The security module 1504 may send an external copy of the temporary key (e.g., Ks_ext_ NAF) to ME/GBA module 1506 at 1579. At 1580, the security module 1504 may derive an RP-specific session key (e.g., Krp) for use in authenticating to the RP 1512. RP-specific session key (e.g., Krp) and an internal copy of the temporary key (e.g., Ks_int_NAF) may be stored on the security module 1504 at 1581. The lifetime of the temporary key (e.g., Ks_ext_ NAF) and a bootstrapping transaction identifier (B-TID) associated with the temporary key (e.g., Ks_ext_ NAF) may be sent from ME/GBA module 1506 to ME/BA 1508 at 1582. At 1583, a request (e.g., an HTTP request) may be sent from ME/BA 1508 to ME/GBA 1506 that includes the NAF_ID. At 1584, ME/GBA module 1506 may send security module 1504 a command to calculate a digest using the internal temporary key (e.g., Ks_int_NAF) as a password. The communication from ME/GBA may also include the fully qualified domain name (FQDM). Security module 1504 may verify the FQDM at 1585 and calculate the digest at 1586. At 1587, security module 1504 may send the calculated digest with the temporary key (e.g., Ks_int_NAF) as a password. At 1588, ME/GBA module 1506 may send the digest and B-TID to ME/BA 1508. ME/BA 1508 may send a request (e.g., HTTP request) to network OP/NAF 1510 that includes B-TID at 1589.

If OP/NAF 1510 has a valid temporary key (e.g., Ks_int_ NAF), then OP/NAF 1510 may use the valid temporary key. The valid temporary key may match a corresponding key stored in the security module at the wireless device and may be derived using the same, or similar, key derivation function acting on the same, or similar, parameter set. Otherwise, OP/NAF 1510 may retrieve a valid temporary key from BSF/HSS 1502, as illustrated in steps 1590 to 1592 of FIG. 15B. For example, network OP/NAF 1510 may send a request for keys and user security settings (USS) to BSF/HSS 1502 at 1590. The request may also include an NAF_ID and B-TID. At 1591, BSF/HSS 1502 may derive the temporary key (e.g., Ks_(ext/int)_NAF) and fetch GBA USS (GUSS). At 1592, BSF/HSS 1502 may send the temporary key (e.g., Ks_(ext/int)_NAF), GUSS, and a key lifetime for the temporary key to network OP/NAF 1510.

At 1593, network OP/NAF 1510 may verify the password attribute using the valid temporary key (e.g., Ks_int_NAF). Network OP/NAF 1510 may derive the Rp-specific session key (e.g., Krp) at 1594 from the temporary key (e.g., Ks_int_NAF). The assertion message may be signed at 1596 with the key established through association. At 1595, network OP/NAF 1510 may send a redirect message to ME/BA 1508, redirecting ME/BA 1508 to RP 1512. The redirect message may include an authentication assertion. The ME/BA 1508 may send the authentication assertion to RP 1512 at 1597 and RP 1512 may validate the authentication assertion at 1598.

Figure 16A:
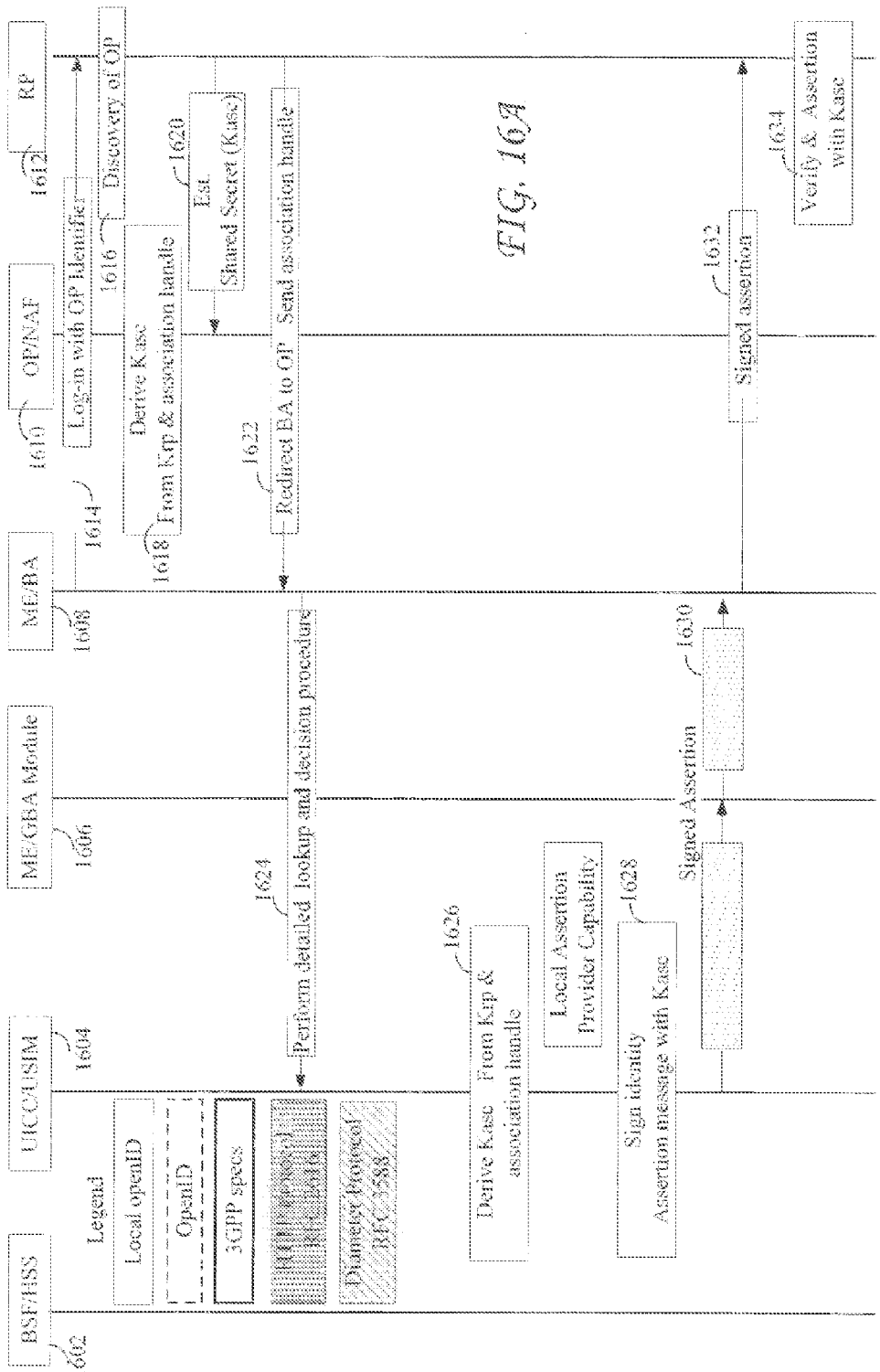
FIG. 16A illustrates an example embodiment of a protocol flow for an authentication phase integrating a single sign on (SSO) protocol with Generic Bootstrap Architecture (GBA)
Figure 16B:
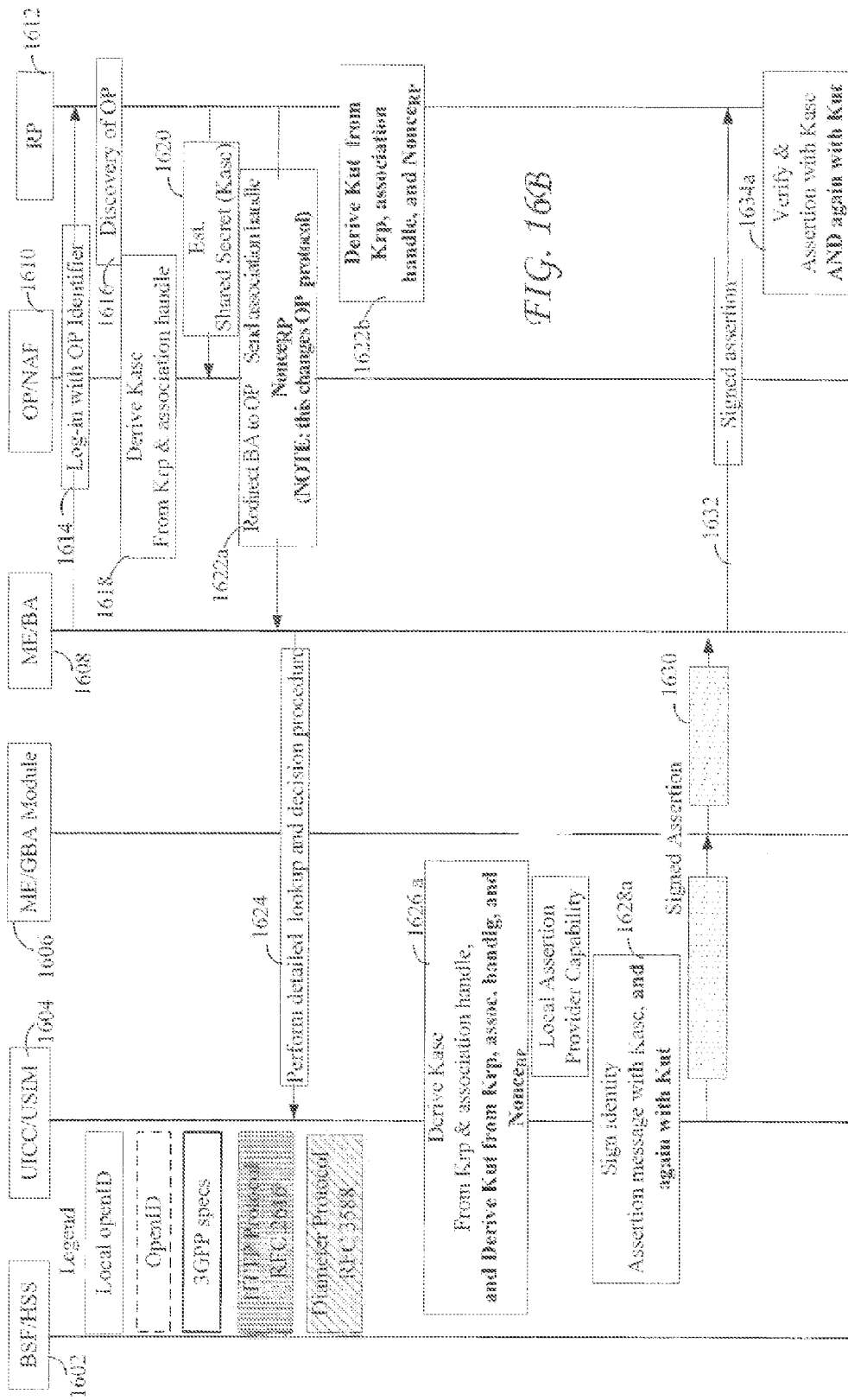
FIG. 16B illustrates an example embodiment of a protocol flow for an authentication phase integrating an SSO protocol with GBA that secures a device to a relying party (RP) channel.

FIGS. 16A and 16B illustrate example embodiments of a protocol flow for an authentication phase. For example, the authentication phase may integrate an SSO protocol, such as Mobile Local OpenID, with GBA.

As illustrated in FIG. 16A, ME/BA 1608 may send a login request to RP 1612 at 1614. The login request may include an identifier, such as an OP identifier for example. At 1616, RP 1612 may perform discovery of OP. At 1618, network OP/NAF 1610 may derive a signature key (e.g., Kasc) from a session key (e.g., Krp) and an association handle. Network OP/NAF 1610 and RP 1612 may establish a shared secret signature key (e.g., Kasc) at 1620. At 1622, RP 1612 may redirect ME/BA 1608 to the local OP on security module 1604. The redirect message may include the association handle. Security module 1604 and ME/BA 1608 may perform a detailed lookup and decision procedure at 1624. At 1626, security module 1604 may derive the signature key (e.g., Kasc) from the session key (e.g., Krp) and the association handle. The security module 1604 may sign the identity assertion message with the signature key (e.g., Kasc) at 1628 and send the signed assertion to ME/BA 1608 at 1630. As shown in FIG. 16A, the signed assertion message may be sent to ME/BA 1608, via ME/GBA module 1606. At 1632, the signed assertion message may be sent from ME/BA 1608 to RP 1612 and RP 1612 may verify the identity assertion at 1634 using the signature key (e.g., Kasc). After RP 1612 has verified the identity assertion, a user may be able to access services, such as via ME/BA 1608 for example.

FIG. 16B illustrates an another example embodiment of a protocol flow for an authentication phase. The protocol flow illustrated in FIG. 16B is similar to the protocol flow illustrated in FIG. 16A, but the protocol flow illustrated in FIG. 16B shows a secure channel between the RP and the device. The protocol flow illustrated in FIG. 16B may be used, for example, to perform an authentication phase for integrating Mobile Local OpenID with GBA with a nonce provisioning which may serve to support the setup of a secure channel between the RP and the device for subsequent communication.

As illustrated in FIG. 16B, at 1622*a*, RP 1612 may include a nonce (e.g., Nonce$_{rp}$) in the redirect message to ME/BA 1608. A secure channel key Kut may be derived from the session key (e.g., Krp), the association handle, and the nonce (e.g., Nonce$_{rp}$). At 1628*a*, the security module 1604 may sign the identity assertion message with the signature key and the secure channel key Kut. At 1634*a*, the RP 1612 may verify the identity assertion message with the signature key and the secure channel key Kut. The use of the secure channel key Kut may support the setup and use of a secure channel between the RP and the security module and/or device associated with the security module.

In GBA, the Ks GAA master session key may be derived by the GBA Module, i.e. a piece of software in the UE. The Ks may be a concatenation of the CK and IK as returned by an AUTHENTICATE command sent to the USIM.

In the case of GBA_ME, where the UICC does not support GBA specific features, the GBA module may reside on the device itself, and may derive the NAF specific temporary key (e.g., Ks_NAF) from NAF_ID and Ks (and RAND, IMPI).

The temporary key (e.g., Ks_NAF) may then be given to the application (e.g. browser) when requested for an authentication with a NAF. While the security of the key may be guaranteed while being held inside the GBA module, the security of the temporary key (e.g., Ks_NAF) may be in the responsibility of the application.

In GBA_ME (the normal GBA), the temporary key may be stored in the device and hence potentially known to the device owner. For security sensitive operations, the variant GBA_U may store the GBA temporary keys in the UICC.

In GBA_U the temporary keys Ks may remain in the smart card, and two keys may be derived using two different methods. The temporary key (e.g., Ks_ext_NAF) may then be given to the application.

To indicate the use of GBA_U the GUSS may contain information that the LSB from XRES has to be bit-flipped.

In GBA_U the security module may run in 'GBA Derivation' module. The GBA module may run UMTS AUTHENTICATE command, resulting in internal creation of the temporary key Ks and internal storage of the temporary key Ks. The USIM may return RES (with LSB flipped) to the GBA module.

For the actual authentication, the GBA module may send the NAF-ID to the USIM and as a result receive the temporary key (e.g., Ks_ext_NAF) which may be used by the application. The temporary key (e.g., Ks_ext_NAF) may be used by the application and has the same security properties as the temporary key (e.g., Ks_NAF) in GBA_ME.

Further secret keys may be derived out of a temporary key (e.g., Ks_NAF, when GBA_ME is implemented) or another temporary key (e.g., Ks_int_NAF, when GBA_U is implemented).

Figure 17:
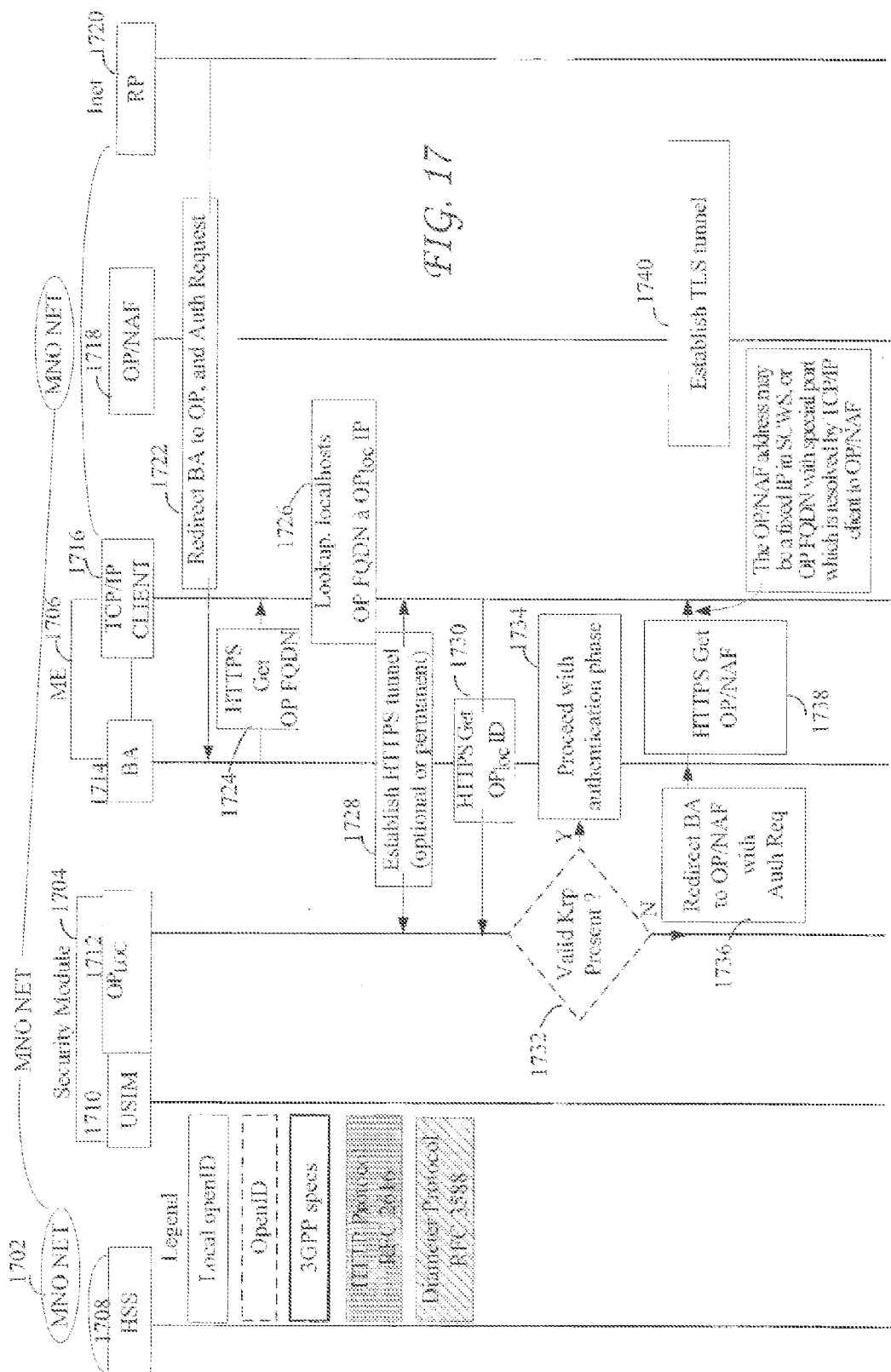
FIG. 17 illustrates an example embodiment of a protocol flow for using domain name server (DNS) look-up.

FIG. 17 illustrates an example embodiment of a protocol flow for using DNS look-up as a means to bypass a Bootstrap Function. This may be performed, for example, during the provisioning phase of an SSO protocol, such as the OpenID/ GBA protocol shown in FIGS. 15A and 15B for example.

The entities illustrated in FIG. 17 include HSS 1708, security module (e.g., UICC) 1704, ME 1706, OP/NAF 1718, and RP 1720. Security module 1704 may be associated with a wireless device, such as a WTRU for example, and include USIM 1710 and local OP 1712. ME 1706 may include BA 1714 and TCP/IP client 1716. OP/NAF 1718 and HSS 1708 may be a part of a network, such as MNO network 1702 for example.

As illustrated in FIG. 17, RP 1720 may send a redirect message to BA 1714 at 1722, redirecting BA 1714 to local OP 1712. The redirect message may include an authentication request. At 1724, BA 1714 may request (e.g., HTTPS GET request) the local OP fully qualified domain name (FQDN) from the TCP/IP client 1716. The TCP/IP client 1716 performs a lookup at 1726 to determine the local OP IP from the OP FQDN and (optionally) establishes an HTTPS tunnel with the local OP 1712 at 1728. At 1730, TCP/IP client 1716 requests (e.g. via HTTPS GET message) the local OP identifier. The local OP 1712 determines whether a session key (e.g., Krp) is present at 1732, and if the session key is present, the local OP 1712 proceeds with identity authentication as described herein at 1734. If the session key is not present, then local OP 1712 sends a redirect message at 1736 to BA 1714, redirecting BA 1714 to OP/NAF 1718. The redirect message may include an authentication request. At 1738, BA 1714 may request the OP/NAF 1718 address from TCP/IP client 1716. In one example embodiment, the OP/NAF 1718 address may be a fixed IP in a SCWS, or OP FQDN with a special port that is resolved by the TCP/IP client 1716 to OP/NAF 1718. At 1740, OP/NAF 1718 may establish a TLS tunnel and/or perform authentication at the network as described herein.

As shown in FIG. 17, the protocol flow may use a local DNS look-up as a means to bypass the GBA module. The RP 1720 may use the URL (e.g., http://opsf.org) of the OP/NAF 1718 to redirect the BA 1714 to that service. According to one example, 3GPP TR 33.924 may describe a network-based function that integrates both a OpenID Provider (OP) and 3GPP Network Application Function (NAF) functions, and also may provide example OPSF functions. The local DNS lookup may map the URL of the OP/NAF 1718 to a known IP address (e.g. 127.0.0.1) of the local OP 1712. Thus, instead of being redirected to the OP/NAF 1718, the BA 1714 may be tricked, via the local DNS lookup, into proceeding directly to the local OP 1712, as shown in FIG. 17 from 1722 to 1730.

The BA 1714 may proceed to the local OP 1712 on the security module as per the local DNS lookup. The local OP may then check to determine if a valid session key (e.g., Krp) is present. If it is present, then the process may proceed to the authentication phase, such as the authentication phase shown in FIGS. 16A and 16B for example. If no valid session key (e.g., Krp) is present, the local OP may redirect the BA 1714 to real IP address of the OP/NAF 1718. The BA 1714 may then proceed to authentication using the OP/NAF 1718 on the network side.

The cryptographic association between the session key (e.g., Krp), the signature key (e.g., Kasc), and/or the application specific GBA temporary key (e.g., Ks_int_NAF) may be realized via at least two embodiments. According to an embodiment, using a proper key derivation function (KDF), the session key (e.g., Krp) may be derived out of the temporary key (e.g., Ks_int_NAF), i.e., Krp=KDF (Ks_int_NAF) where such derivation may be done by the security module or USIM for example. According to another embodiment, a hash may be used to derive the session key (e.g., Krp) from a secret Kop held by the local OP as well as the AKA parameter RES computed by the USIM, i.e., Krp=HMAC(Kop*,RES), which may be done by the local OP alone. This embodiment may have slightly different semantics, by associating to temporary key K_int_NAF in an indirect way. Also, this embodiment may pose additional requirements on the deployment to ensure the semantics that local OP really sits in the same ICC as the security module or USIM; however the security module or USIM part may be left unchanged, as described herein with the GBA Module. According to one exemplary embodiment, the security module or USIM may be capable of performing a direct flow. One example of a direct flow may be described in 3GPP TR 33.924 directed to Identity Management and 3GPP Security Interworking.

The session key (e.g., Krp) may be established based on credentials/secrets that are known to the OP/NAF and the local OP, as the session key (e.g., Krp) may be later used to derive the secret key, such as the signature key (e.g., Kasc), to sign the assertion messages. The creation of the session key (e.g., Krp) credential may be bound to a previous authentication process such as GBA or AKA to achieve the establishment of the secret session key (e.g., Krp) in local OP and/or OP/NAF. The KDF, being part of the local OP, residing on the security module or smartcard, may be directly access and/or read the key material from the previous authentication.

In one example embodiment, in the case of GBA the local OP may read the temporary key (e.g., Ks_int_NAF) from the security module or USIM and perform the key derivation using own logic with the temporary key (e.g., Ks_int_NAF) as input parameter to KDF yielding the session key (e.g., Krp). In another embodiment, the local OP may ask the security module or USIM (via an interface or call to be specified for example) to derive the session key (e.g., Krp) using a security key or USIM internal KDF which may also be known to the OP/NAF. The local OP may get the result of the KDF and use/store it as the session key (e.g., Krp). In both cases, the OP/NAF may get the temporary key (e.g., Ks_int_NAF) from the BSF (e.g., over a Zn interface, such as the Zn interface shown in TS 33.220 for example) and apply the same KDF to it to retrieve the session key (e.g., Krp).

Since the local OP resides in the security module or SC it may be provisioned by the MNO (e.g., using OTA mechanisms or installed on the SC when the UICC is personalized with the USIM). In either case the local OP application itself may be equipped with a secret (e.g., saved as Java Card Objects on card). This secret may then be known to the local OP and the MNO (and hence to the OP/NAF, operated by the MNO). This secret may be referred to herein as Kop*. The derivation of the session key (e.g., Krp) may be decoupled from security module (e.g., USIM/UICC) capabilities and just the output from the network authentication (e.g., GBA or AKA runs), such as the RES coming from the USIM, may be used. The RES may contain implicit information about the USIM secrets for authentication. The local OP may apply the KDF to the RES and Kop*, yielding the session key (e.g., Krp). According to one embodiment, no entity other than the OP/NAF (and the MNO for example) may derive that same session key (e.g., Krp) even though RES is public. OP/NAF may compare RES to XRES and if they match, derives the session key (e.g., Krp) from the same seed material, resulting in the same session key (e.g., Krp).

The embodiments described above may be used when local OpenID/GBA, tries to use local OpenID in a 'multi-factor' way. This may refer to any implementation that may try to combine a SSO protocol, such as OpenID, with some other authentication, signing, crypto vault, or any secret functionality on the UICC, or elsewhere in the UE.

It may be desirable to protect the subsequent communication between the RP and the device (UE), for example in FIGS. 15-16, with respect to the OP/NAF. In this regard, a separate and independent mutual authentication procedure may be used between the two entities. Some methods to achieve channel security are described herein. Some embodiments, however, may not achieve OP/NAF independence.

In an example embodiment, a variant of the authentication phase of the detailed protocol flow shown in FIG. 16B may be performed. At 1622a in FIG. 16B, a nonce may be sent from the RP to the UE. This nonce may serve as an additional input to the key derivation function. At 1626b, Kut may be derived from the session key (e.g., Krp), the association handle established between the OP/NAF and RP, and Nonce$_{RP}$. This may achieve the desired secure channel. However, this may change the original OpenID protocol because it may implement changes to the RP (e.g., session handling for the nonces, etc). In terms of security there may be a minimal benefit; because the Nonce$_{RP}$ may not be protected it may (in principle) be read by OP/NAF as well and then the same assertion message may be generated by the OP/NAF. Thus, isolation from the OP/NAF may not be achieved.

In another example embodiment, the UE and RP may exchange nonces (nonce1 from the UE and nonce2 from the RP) at an initial stage (before discovery) of the protocol. For example, this may be performed at 1614 and/or 1616 in FIG. 16B. This may be considered critical since the OP/NAF may not be art of the initial communication and may therefore be presumed to be blind of nonce exchange. This may provide the pre-condition for isolation from that entity. Once OpenID is complete and both sides may share the signature key (e.g., Kasc), a Diffie-Hellman key agreement procedure, for example, may be used to establish the secret keys that can be used to secure the channel. That is, the UE may send the following message to the RP:

$a^x$, Enc$_{Kasc}$ {SHA-X($a^x$, nonce2)} (where x is a random number chosen by the UE, and Enc$_{Kasc}$ {SHA-X($a^x$, nonce2)} denotes cryptographic signature (signed by the signature key Kasc) of A where A is {$a^x$, nonce2});

and the RP may send the following message to the UE:

$a^y$, Enc$_{Kasc}$ {SHA-X($a^y$, nonce1)}, (where y and random number chosen by the RP, and Enc$_{Kasc}$ {SHA-X($a^y$, nonce1)} denotes cryptographic signature (signed by key the signature key Kasc) of B where B is {$a^y$, nonce1}));

This protocol may rely on a discrete logarithm. The calculations may take place in the multiplicative group $Z_p^*$ (derived from the field $Z_p$), where p is a large prime and the value "a" is a generator of a large prime-order subgroup (of $Z_p^*$). Both a and p may be known publically and so $a^{xy}$ mod p may be calculated by both sides thus securing the channel. The UE may know x and the RP may know y. For example, the UE, knowing $a^y$, may have enough information to calculate $a^{xy}$ mod p. The RP may be able to perform a similar calculation using $a^x$. Since signatures A and B may be verifiable by, respectively, the RP and UE the process involves mutual authentication and the man-in-the-middle attack may be avoided given that the OpenID/NAF may not be involved in the initial communication. It may also be possible to get similar results with the use of only one nonce, say, nonce1, in both signatures above.

The shared signature key (e.g., Kasc) may be used to provide signatures in support of an authenticated version of the Diffie-Hellman protocol. This a priori key sharing may allow for the establishment of a secure channel without the use of Diffie-Hellman.

In another example embodiment, as a modification to the protocol described above a secure channel may be established initially employing a TLS tunnel. Using a certificate authority (CA), the RPs public key may be sent to the UE via a certificate. The UE may generate a random number (nonce) and may send it encrypted using the RPs public key to the RP. Both sides may generate a shared symmetric key using the nonce. The OP/NAF may be out of the loop since it may be assumed that the user initiates the communication. A secure transport layer channel may now be established where one-way authentication of the RP has occurred. Once OpenID is complete both sides may generate Kut using the nonce and the signature key (e.g., Kasc). Additionally, it may generate the desired secure channel to establish independence from the OP/NAF.

It appears that the OP/NAF may theoretically hijack the session if it, instead of the UE, sends a nonce to the RP in the initial stages, but that would make no sense in this context. The OP/NAF may be unaware of the communication before discovery and, even if it were, it may not be a miscreant.

The embodiments described below outline integration variants of OpenID (and local OP) with AKA.

Figure 18:
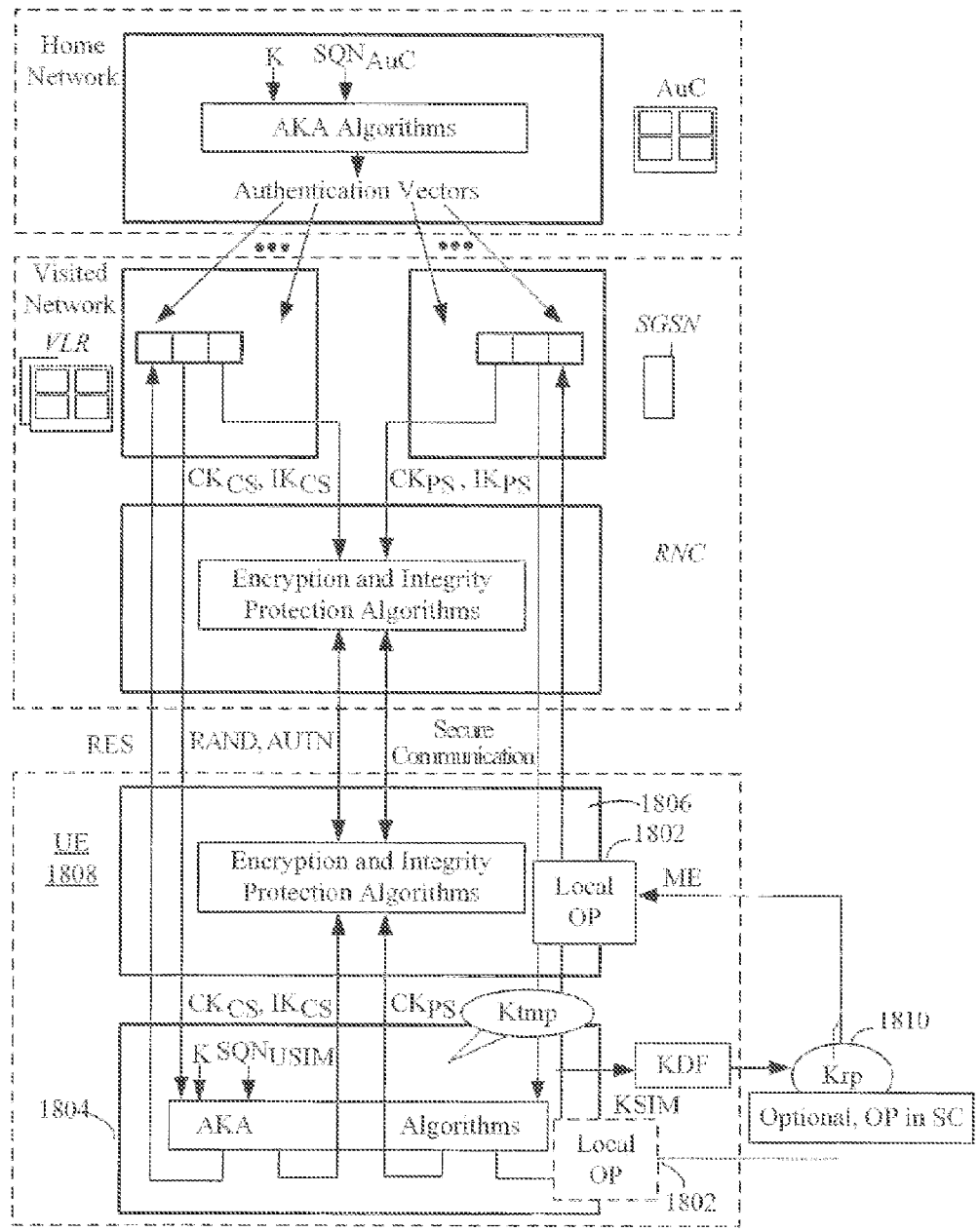
FIG. 18 illustrates an example embodiment a protocol flow for Authentication and Key Agreement (AKA)

FIG. 18 illustrates an example embodiment a protocol flow for Authentication and Key Agreement (AKA). The embodiments described herein may be implemented using AKA and CK/IK. For example, authentication may be performed using the CK/IK established in the wireless device and/or security module and on the network after a successful AKA run. The established AKA keys may be provided to a local OP 1802, such as on a security module 1804, or on the mobile equipment (ME) 1806 of the user equipment 1808 for example. The AKA keys may be provided to the local OP 1802 by deriving the session key (e.g., Krp) 1810 from the CK/IK using a key derivation function. The CK/IK may be an input to the key derivation function, similar to the temporary key Ktmp described herein. This may result in the network (e.g., OPSF) and the device (e.g., local OP) being in possession of the same session key (e.g., Krp) 1810 for an RP. After the session key is established, it may be used as described herein. While AKA is described herein, other protocols may be used, such as IMS based authentication or other authentication and key agreement protocols for example.

In one example embodiment, the amount of AVs which may be used for user authentication may be reduced. AVs may use an access to the HSS and queries to the HSS may be reduced.

In one example embodiment, instead of using a new AV for each user login, the AKA mechanism may be combined with a password (or a hash of a password for example) which may be set up between the user and the OP. The OP may be implemented as a web service with an interface to the HSS to get AVs, and an HTTP interface to communicate with the UE/Browser.

A user password may be shared securely with the OP. There may be two different flows described herein with regard to the user password: an enrollment flow and an authentication flow. The enrollment flow may be used to authenticate and/or share the password, which may take place during the first log in to an RP for example. The authentication flow may be used for subsequent authentications. For example, when the password may be established, the authentication flow may take place. If the device (e.g. WTRU) reboots, the AKA keys may become invalid and may be replaced by the network authentication procedures.

Described herein is an example embodiment of the enrollment flow. In the enrollment flow, a user may want to log in at the RP. The user may be redirected to the local OP. The local OP may fetch the AV from the HSS (e.g., based on IMSI). The local OP may challenge the UE to authenticate (which may be performed via HTTP Digest AKA, since OpenID uses the HTTP protocol and the communication takes place between browser and local OP). The browser may extract the AV from the request and proceed according to the HTTP Digest AKA process. The local OP may verify the response and before issuing the signed assertion redirect message, may ask the user to select a password. Mutual authentication based on AKA AV may be achieved at this stage, so the local OP may know the user. Communications may be secure based on the CK,IK keys. The user may set a password with the local OP, where either the password or a hash of it (e.g., as in HTTP Digest Authentication) may be sent to the local OP. The OP may store the password (or hash) and the AV for future use. The OP may issue the signed assertion message redirect to the RP. The UE may be redirected to the RP which may verify the assertion and that the user is logged in.

Described herein is an example embodiment of the authentication flow. In the authentication flow, the user may want to log in at the RP. The user may be redirected to the local OP. The local OP may not fetch a new AV from HSS but may use the stored one based on IMSI. The local OP may challenge the UE to authenticate, using a modified HTTP Digest AKA process for example. The local OP may indicate that a user password exists and the browser must be able to understand the flag. The browser may extract the AV from the request and proceed according to the HTTP Digest AKA process. When the browser receives the RES from the security module or USIM, the browser may ask the user for the password (as in HTTP Digest Authentication) and then combine the RES with the password using a suitable cryptographic implementation (e.g., by calculating rsp=f(RES|f(password))), where f is a hash function (e.g., SHA1) and '|' denotes a concatenation. The result rsp may be used as the password in the authentication response to the local OP. The local OP may perform the same calculation (e.g., if the hash of the password is known, the local OP may calculates xrsp=f(XRES|hashedpassword)) and verify that the response from the browser rsp matches xrsp. The local OP may issue the signed assertion message redirect to the RP. The UE may be redirected to the RP which may verify the assertion and the user is logged in.

The HTTP Digest AKA performed in the enrollment and authentication flows may be performed inside an HTTPS tunnel to protect authentication information (e.g., authentication credentials, such as the user password) if no additional encryption is employed. When the OP issues an authentication challenge to the wireless device in the enrollment or authentication flow, a nonce may be part of the challenge message. In such an implementation, the authentication response may calculate and/or send to the OP the hash f(RES|f(password)|nonce), where the presence of the nonce may provide the quality of freshness to the calculation. The hash provided in the response message may employ a key to provide an additional measure of authenticity by way of a signature. If the OP has the authentication information (e.g., user password) instead of a hash of it, the hash response may be f(RES|password|nonce), where there may be no inner hash of the password.

In one example embodiment, hash chains may be used to derive a number n of different one-time passwords from the initial RES generated during the first AKA authentication. The browser may extract the AUTN and perform the AKA algorithms with the USIM. The browser may generate a seed value s and from that seed value may calculate the hash chain by subsequently applying a hash function, where the ith value in the hash chain $v_i = h^i(s)$, with $h^i(s) = h(h(h(\ldots h(s))$ [i times]. The browser may request a signature using the IK on $h''(s)$ and send RES together with $h''(s)$ and the signature to the local OP. The local OP may store the hash chain commitment $h''(s)$ if the RES=XRES.

In further authentications, the local OP may challenge the browser in an HTTP Digest Authenticate request to provide the next (i.e., the value before the index used in the last authentication) hash value (i.e., in the first authentication after the enrollment and hash-chain commitment, the browser may calculates $h^{n-1}(s)$ and send it to the local OP). The local OP may now calculate h $(h^{n-1}(s)) = h''(s)$ and compare that to the received hash chain commitment. Due to the one-way property of the hash-function it may be difficult, if not impossible, to guess $h^{n-1}(s)$ from $h''(s)$.

The seed value s of the hash chain may also be provided by a user password or a PIN code which may be requested each time the user authenticates.

Similar to the embodiments described in FIGS. 15-16 with regard to the OpenID/GBA binding with local OpenID, a local entity may be used to sign assertion messages without the need to use AVs for every login. The AVs may be directly transported in the OpenID association handle (i.e., the OP-agg/OPSF on the network side may get an AV from HSS and may integrate the RAND and AUTN into the association handle which may be passed to the local OP through the browser). The local OP (or the browser) may extract the fields, and the local OP may perform AKA with the USIM and sign the assertions with the resulting IK. If IK is not available to the local OP or the local OP does not use the USIM to sign the assertion, a key may be derived from the IK (GBA-like) to use it for assertion signing. The hash-chain method may be used to increase the number of possible authentications per AKA run.

In one example embodiment, the local OP may not sign the assertion message itself, but may provide the web interface and application logic. For example, the local OP may build the assertion message, but without the signature. The local OP may then use the security module (e.g., USIM/UICC) functionality to generate and/or calculate the signature which may then be included in the final message sent back to the RP via the user's browser. The local OP may build a middle layer between browser and security module (e.g., USIM/UICC) for the OpenID protocol while providing local assertions and saving network traffic for the actual user authentication.

Figure 19A:
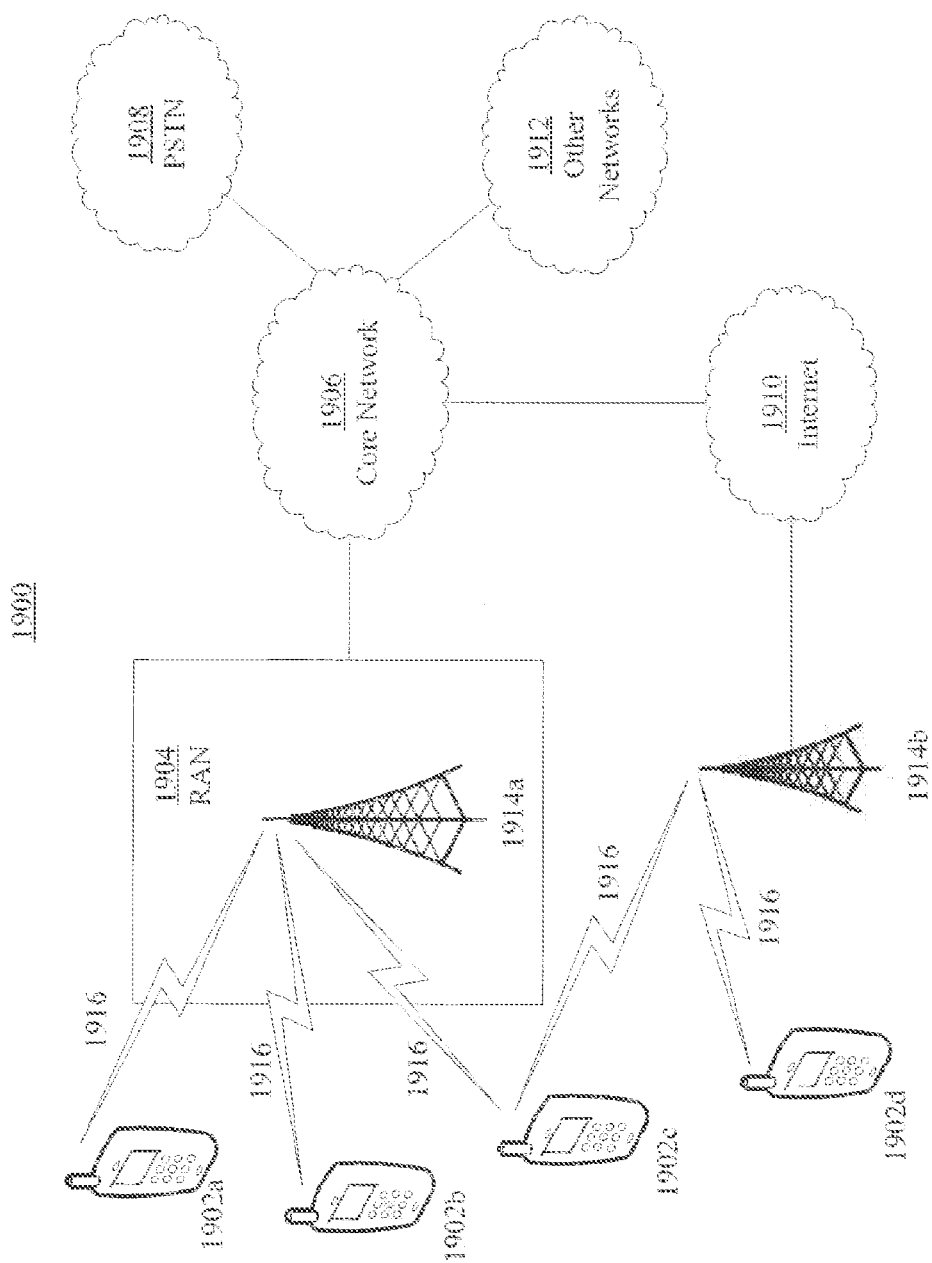
FIG. 19A illustrates an example communications system in which one or more disclosed embodiments may be implemented.

FIG. 19A is a diagram of an example communications system 1900 in which one or more disclosed embodiments may be implemented. The communications system 1900 may be a multiple access system that provides content, such as voice, data, video, messaging, broadcast, etc., to multiple wireless users. The communications system 1900 may enable multiple wireless users to access such content through the sharing of system resources, including wireless bandwidth. For example, the communications systems 1900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 19A, the communications system 1900 may include wireless transmit/receive units (WTRUs) 1902a, 1902b, 1902c, 1902d, a radio access network (RAN) 1904, a core network 1906, a public switched telephone network (PSTN) 1908, the Internet 1910, and other networks 1912, though it will be appreciated that the disclosed embodiments contemplate any number of WTRUs, base stations, networks, and/or network elements. Each of the WTRUs 1902a, 1902b, 1902c, 1902d may be any type of device configured to operate and/or communicate in a wireless environment. By way of example, the WTRUs 1902a, 1902b, 1902c, 1902d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1900 may also include a base station 1914a and a base station 1914b. Each of the base stations 1914a, 1914b may be any type of device configured to wirelessly interface with at least one of the WTRUs 1902a, 1902b, 1902c, 1902d to facilitate access to one or more communication networks, such as the core network 1906, the Internet 1910, and/or the networks 1912. By way of example, the base stations 1914a, 1914b may be a base transceiver station (BTS), a Node-B, an eNode B, a Home Node B, a Home eNode B, a site controller, an access point (AP), a wireless router, and the like. While the base stations 1914a, 1914b are each depicted as a single element, it will be appreciated that the base stations 1914a, 1914b may include any number of interconnected base stations and/or network elements.

The base station 1914a may be part of the RAN 1904, which may also include other base stations and/or network elements (not shown), such as a base station controller (BSC), a radio network controller (RNC), relay nodes, etc. The base station 1914a and/or the base station 1914b may be configured to transmit and/or receive wireless signals within a particular geographic region, which may be referred to as a cell (not shown). The cell may further be divided into cell sectors. For example, the cell associated with the base station 1914a may be divided into three sectors. Thus, in one embodiment, the base station 1914a may include three transceivers, i.e., one for each sector of the cell. In another embodiment, the base station 1914a may employ multiple-input multiple output (MIMO) technology and, therefore, may utilize multiple transceivers for each sector of the cell.

The base stations 1914a, 1914b may communicate with one or more of the WTRUs 1902a, 1902b, 1902c, 1902d over an air interface 1916, which may be any suitable wireless communication link (e.g., radio frequency (RF), microwave, infrared (IR), ultraviolet (UV), visible light, etc.). The air interface 1916 may be established using any suitable radio access technology (RAT).

More specifically, as noted above, the communications system 1900 may be a multiple access system and may employ one or more channel access schemes, such as CDMA, TDMA, FDMA, OFDMA, SC-FDMA, and the like. For example, the base station 1914a in the RAN 1904 and the WTRUs 1902a, 1902b, 1902c may implement a radio technology such as Universal Mobile Telecommunications System (UMTS) Terrestrial Radio Access (UTRA), which may establish the air interface 1916 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1914a and the WTRUs 1902a, 1902b, 1902c may implement a radio technology such as Evolved UMTS Terrestrial Radio Access (E-UTRA), which may establish the air interface 1916 using Long Term Evolution (LTE) and/or LTE-Advanced (LTE-A).

In other embodiments, the base station 1914a and the WTRUs 1902a, 1902b, 1902c may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1914b in FIG. 19A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1914b and the WTRUs 1902c, 1902d may implement a radio technology such as IEEE 802.11 to establish a wireless local area network (WLAN). In another embodiment, the base station 1914b and the WTRUs 1902c, 1902d may implement a radio technology such as IEEE 802.15 to establish a wireless personal area network (WPAN). In yet another embodiment, the base station 1914b and the WTRUs 1902c, 1902d may utilize a cellular-based RAT (e.g., WCDMA, CDMA2000, GSM, LTE, LTE-A, etc.) to establish a picocell or femtocell. As shown in FIG. 19A, the base station 1914b may have a direct connection to the Internet 1910. Thus, the base station 1914b may not be required to access the Internet 1910 via the core network 1906.

The RAN 1904 may be in communication with the core network 1906, which may be any type of network configured to provide voice, data, applications, and/or voice over internet protocol (VoIP) services to one or more of the WTRUs 1902a, 1902b, 1902c, 1902d. For example, the core network 106 may provide call control, billing services, mobile location-based services, pre-paid calling, Internet connectivity, video distribution, etc., and/or perform high-level security functions, such as user authentication. Although not shown in FIG. 19A, it will be appreciated that the RAN 104 and/or the core network 1906 may be in direct or indirect communication with other RANs that employ the same RAT as the RAN 1904 or a different RAT. For example, in addition to being connected to the RAN 1904, which may be utilizing an E-UTRA radio technology, the core network 1906 may also be in communication with another RAN (not shown) employing a GSM radio technology.

The core network 1906 may also serve as a gateway for the WTRUs 1902a, 1902b, 1902c, 1902d to access the PSTN 1908, the Internet 1910, and/or other networks 1912. The PSTN 1908 may include circuit-switched telephone networks that provide plain old telephone service (POTS). The Internet 1910 may include a global system of interconnected computer networks and devices that use common communication protocols, such as the transmission control protocol (TCP), user datagram protocol (UDP) and the internet protocol (IP) in the TCP/IP internet protocol suite. The networks 1912 may include wired or wireless communications networks owned and/or operated by other service providers. For example, the networks 1912 may include another core network connected to one or more RANs, which may employ the same RAT as the RAN 1904 or a different RAT.

Some or all of the WTRUs 1902a, 1902b, 1902c, 1902d in the communications system 1900 may include multi-mode capabilities, i.e., the WTRUs 1902a, 1902b, 1902c, 1902d may include multiple transceivers for communicating with different wireless networks over different wireless links. For example, the WTRU 1902c shown in FIG. 19A may be configured to communicate with the base station 1914a, which may employ a cellular-based radio technology, and with the base station 1914b, which may employ an IEEE 802 radio technology.

Figure 19B:
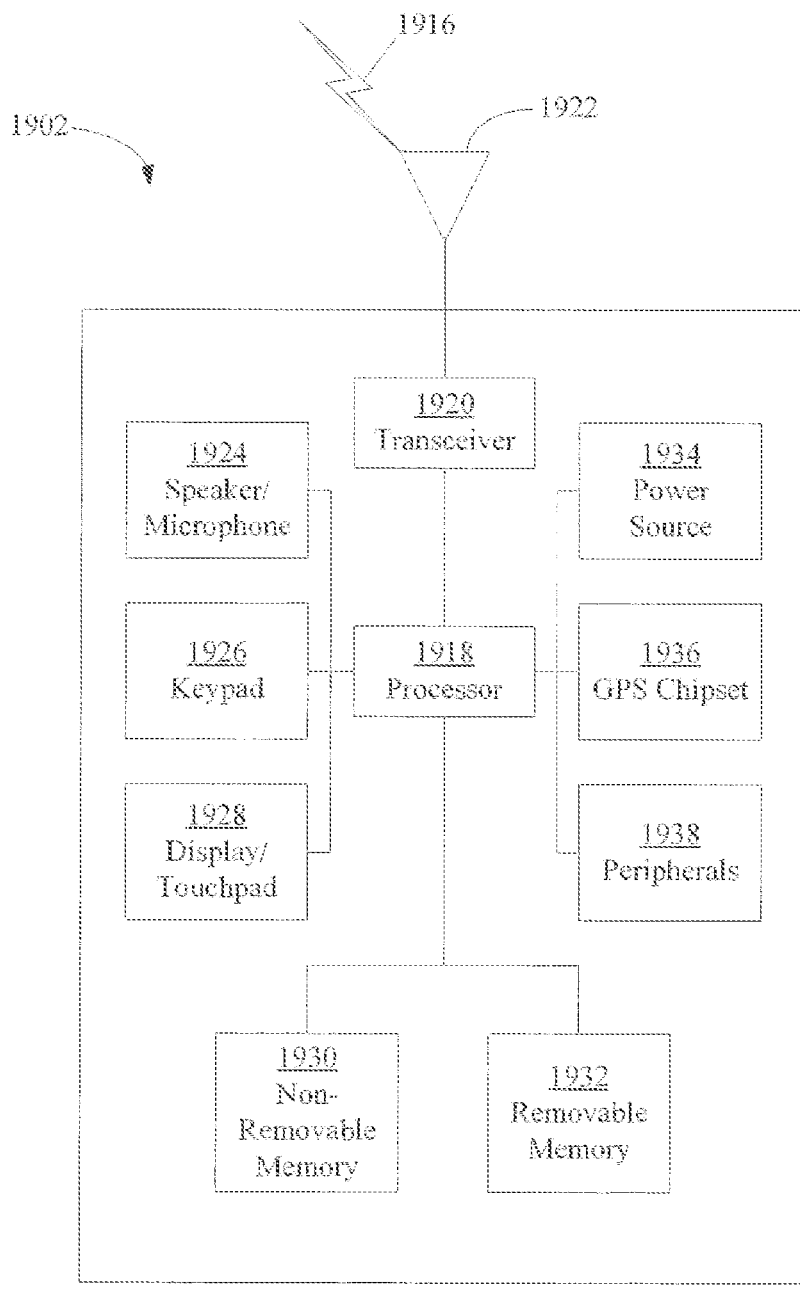
FIG. 19B illustrates an example wireless transmit/receive unit in which one or more disclosed embodiment may be implemented.

FIG. 19B is a system diagram of an example WTRU 1902. As shown in FIG. 19B, the WTRU 1902 may include a processor 1918, a transceiver 1920, a transmit/receive element 1922, a speaker/microphone 1924, a keypad 1926, a display/touchpad 1928, non-removable memory 1930, removable memory 1932, a power source 1934, a global positioning system (GPS) chipset 1936, and other peripherals 1938. It will be appreciated that the WTRU 1902 may include any sub-combination of the foregoing elements while remaining consistent with an embodiment.

The processor 1918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1918 may perform signal coding, data processing, power control, input/output processing, and/or any other functionality that enables the WTRU 1902 to operate in a wireless environment. The processor 1918 may be coupled to the transceiver 1920, which may be coupled to the transmit/receive element 1922. While FIG. 19B depicts the processor 1918 and the transceiver 1920 as separate components, it will be appreciated that the processor 1918 and the transceiver 1920 may be integrated together in an electronic package or chip.

The transmit/receive element 1922 may be configured to transmit signals to, or receive signals from, a base station (e.g., the base station 1914a) over the air interface 1916. For example, in one embodiment, the transmit/receive element 1922 may be an antenna configured to transmit and/or receive RF signals. In another embodiment, the transmit/receive element 1922 may be an emitter/detector configured to transmit and/or receive IR, UV, or visible light signals, for example. In yet another embodiment, the transmit/receive element 1922 may be configured to transmit and receive both RF and light signals. It will be appreciated that the transmit/receive element 1922 may be configured to transmit and/or receive any combination of wireless signals.

In addition, although the transmit/receive element 1922 is depicted in FIG. 19B as a single element, the WTRU 1902 may include any number of transmit/receive elements 1922. More specifically, the WTRU 1902 may employ MIMO technology. Thus, in one embodiment, the WTRU 1902 may include two or more transmit/receive elements 1922 (e.g., multiple antennas) for transmitting and receiving wireless signals over the air interface 1916.

The transceiver 1920 may be configured to modulate the signals that are to be transmitted by the transmit/receive element 1922 and to demodulate the signals that are received by the transmit/receive element 1922. As noted above, the WTRU 1902 may have multi-mode capabilities. Thus, the transceiver 1920 may include multiple transceivers for enabling the WTRU 1902 to communicate via multiple RATs, such as UTRA and IEEE 802.11, for example.

The processor 1918 of the WTRU 1902 may be coupled to, and may receive user input data from, the speaker/microphone 1924, the keypad 1926, and/or the display/touchpad 1928 (e.g., a liquid crystal display (LCD) display unit or organic light-emitting diode (OLED) display unit). The processor 1918 may also output user data to the speaker/microphone 1924, the keypad 1926, and/or the display/touchpad 1928. In addition, the processor 1918 may access information from, and store data in, any type of suitable memory, such as the non-removable memory 1930 and/or the removable memory 1932. The non-removable memory 1930 may include random-access memory (RAM), read-only memory (ROM), a hard disk, or any other type of memory storage device. The removable memory 1932 may include a subscriber identity module (SIM) card, a memory stick, a secure digital (SD) memory card, and the like. In other embodiments, the processor 1918 may access information from, and store data in, memory that is not physically located on the WTRU 1902, such as on a server or a home computer (not shown).

The processor 1918 may receive power from the power source 1934, and may be configured to distribute and/or control the power to the other components in the WTRU 1902. The power source 1934 may be any suitable device for powering the WTRU 1902. For example, the power source 1934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1918 may also be coupled to the GPS chipset 1936, which may be configured to provide location information (e.g., longitude and latitude) regarding the current location of the WTRU 1902. In addition to, or in lieu of, the information from the GPS chipset 1936, the WTRU 1902 may receive location information over the air interface 1916 from a base station (e.g., base stations 1914a, 1914b) and/or determine its location based on the timing of the signals being received from two or more nearby base stations. It will be appreciated that the WTRU 1902 may acquire location information by way of any suitable location-determination method while remaining consistent with an embodiment.

The processor 1918 may further be coupled to other peripherals 1938, which may include one or more software and/or hardware modules that provide additional features, functionality and/or wired or wireless connectivity. For example, the peripherals 1938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19C:
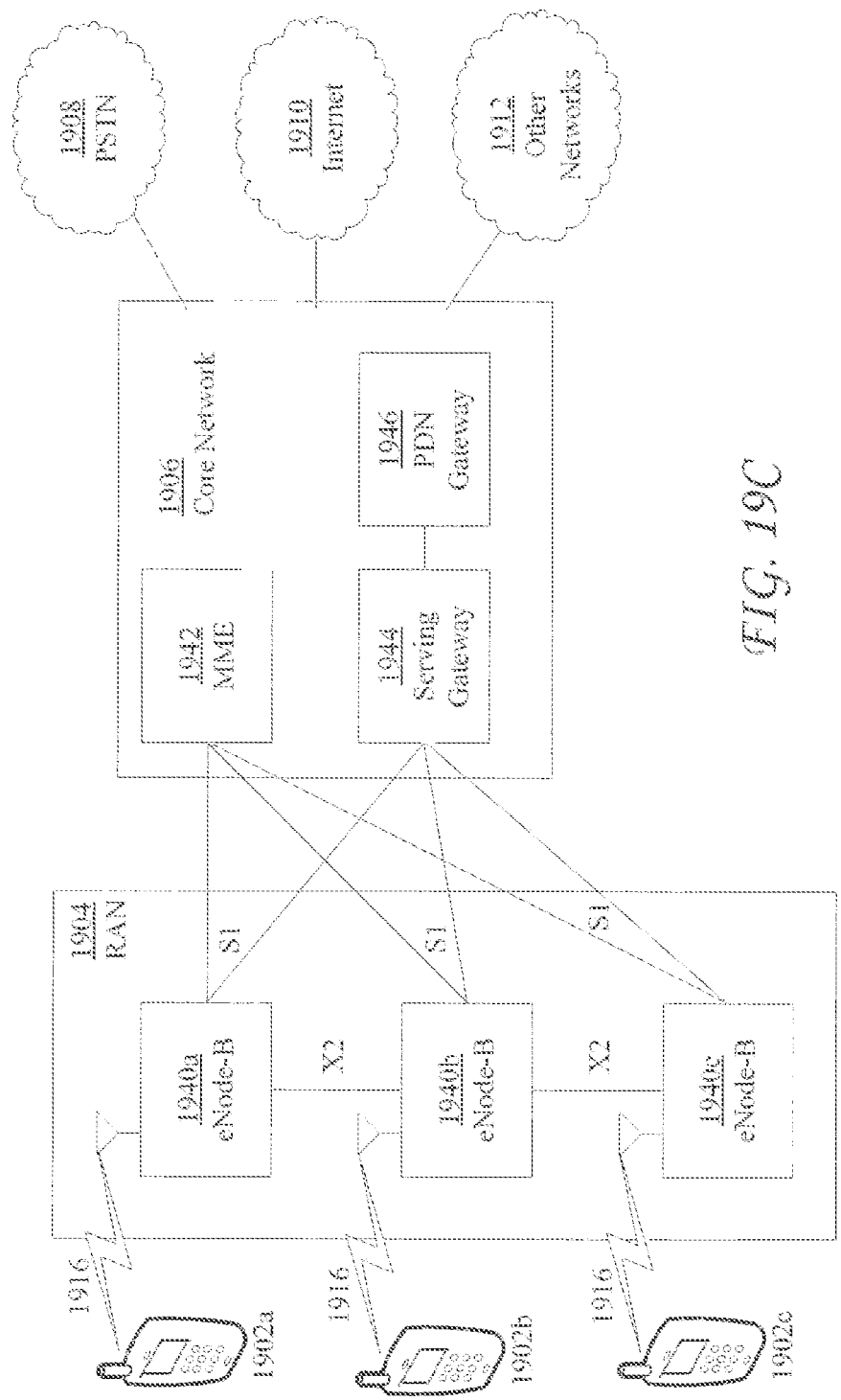
FIG. 19C illustrates an example system radio access network in which one or more disclosed embodiment may be implemented.

FIG. 19C is a system diagram of the RAN 1904 and the core network 1906 according to an embodiment. As noted above, the RAN 1904 may employ an E-UTRA radio technology to communicate with the WTRUs 1902a, 1902b, 1902c over the air interface 1916. The RAN 1904 may also be in communication with the core network 1906.

The RAN 1904 may include eNode-Bs 1940a, 1940b, 1940c, though it will be appreciated that the RAN 1904 may include any number of eNode-Bs while remaining consistent with an embodiment. The eNode-Bs 1940a, 1940b, 1940c may each include one or more transceivers for communicating with the WTRUs 1902a, 1902b, 1902c over the air interface 1916. In one embodiment, the eNode-Bs 1940a, 1940b, 1940c may implement MIMO technology. Thus, the eNode-B 1940a, for example, may use multiple antennas to transmit wireless signals to, and receive wireless signals from, the WTRU 1902a.

Each of the eNode-Bs 1940a, 1940b, 1940c may be associated with a particular cell (not shown) and may be configured to handle radio resource management decisions, handover decisions, scheduling of users in the uplink and/or downlink, and the like. As shown in FIG. 19C, the eNode-Bs 1940a, 1940b, 1940c may communicate with one another over an X2 interface.

The core network 1906 shown in FIG. 19C may include a mobility management gateway (MME) 1942, a serving gateway 1944, and a packet data network (PDN) gateway 1946. While each of the foregoing elements are depicted as part of the core network 1906, it will be appreciated that any one of these elements may be owned and/or operated by an entity other than the core network operator.

The MME 1942 may be connected to each of the eNode-Bs 1940a, 1940b, 1940c in the RAN 1904 via an Si interface and may serve as a control node. For example, the MME 1942 may be responsible for authenticating users of the WTRUs 1902a, 1902b, 1902c, bearer activation/deactivation, selecting a particular serving gateway during an initial attach of the WTRUs 1902a, 1902b, 1902c, and the like. The MME 1942 may also provide a control plane function for switching between the RAN 1904 and other RANs (not shown) that employ other radio technologies, such as GSM or WCDMA.

The serving gateway 1944 may be connected to each of the eNode Bs 1940a, 1940b, 1940c in the RAN 1904 via the Si interface. The serving gateway 1944 may generally route and forward user data packets to/from the WTRUs 1902a, 1902b, 1902c. The serving gateway 1944 may also perform other functions, such as anchoring user planes during inter-eNode B handovers, triggering paging when downlink data is available for the WTRUs 1902a, 1902b, 1902c, managing and storing contexts of the WTRUs 1902a, 1902b, 1902c, and the like.

The serving gateway 1944 may also be connected to the PDN gateway 1946, which may provide the WTRUs 1902a, 1902b, 1902c with access to packet-switched networks, such as the Internet 1910, to facilitate communications between the WTRUs 1902a, 1902b, 1902c and IP-enabled devices.

The core network 1906 may facilitate communications with other networks. For example, the core network 1906 may provide the WTRUs 1902a, 1902b, 1902c with access to circuit-switched networks, such as the PSTN 1908, to facilitate communications between the WTRUs 1902a, 1902b, 1902c and traditional land-line communications devices. For example, the core network 1906 may include, or may communicate with, an IP gateway (e.g., an IP multimedia subsystem (IMS) server) that serves as an interface between the core network 1906 and the PSTN 1908. In addition, the core network 1906 may provide the WTRUs 1902a, 1902b, 1902c with access to the networks 1912, which may include other wired or wireless networks that are owned and/or operated by other service providers.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless device comprising a processor, a memory, and communication circuitry, the wireless device configured to connect to a communications network via the communication circuitry, the wireless device including computer-executable instructions stored in the memory of the wireless device which, when executed by the processor of the wireless device, perform operations comprising:
   receiving a temporary key, wherein the temporary key is derived from a network authentication between the wireless device and a network entity;
   generating, based on the temporary key, a session key associated with a service provider, wherein the session key is shared with the network entity, and wherein the session key is configured for use in a local authentication performed at the wireless device; and
   storing the session key for use in the local authentication at the wireless device.

2. The wireless device of claim 1, wherein the network authentication comprises an authentication and key agreement protocol.

3. The wireless device of claim 2, wherein the authentication and key agreement protocol uses a shared secret between the wireless device and the network entity to derive the temporary key.

4. The wireless device of claim 1, wherein the network authentication comprises a bootstrapping procedure.

5. The wireless device of claim 1, wherein the session key is generated using an internal key derivation function.

6. The wireless device of claim 1, wherein the wireless device further comprises a security module, the operations further comprising at least one of generating or storing the session key using the security module.

7. The wireless device of claim 1, wherein the network entity comprises an OpenID Server Function and the service provider comprises an OpenID Relying Party.

8. The wireless device of claim 1, the operations further comprising:
   receiving a network authentication key associated with the network authentication, from the network entity; and
   deriving the temporary key from the network authentication key.

9. A wireless device comprising a processor, a memory, and communication circuitry, the wireless device configured to connect to a communications network via the communication circuitry, the wireless device including computer-executable instructions stored in the memory of the wireless device which, when executed by the processor of the wireless device, perform operations comprising:
   receiving an association handle from a service provider, wherein the association handle indicates that the service provider has performed an association with a network entity;
   receiving authentication information associated with a user of the wireless device;
   locally verifying the authentication information at the wireless device;
   generating a signature key based on the association handle and a session key associated with the service provider, wherein the session key is derived from a network authentication between the network entity and the wireless device, and wherein the session key is configured for use in performing a local authentication at the wireless device; and
   signing an identity assertion, using the signature key, to indicate that the wireless device has locally verified the authentication information.

10. The wireless device of claim 9, wherein the session key is shared with the network entity for validation of the identity assertion.

11. The wireless device of claim 9, wherein the session key is configured for use in a plurality of local authentications at the wireless device.

12. The wireless device of claim 9, wherein the association handle is received in an authentication request from the service provider.

13. The wireless device of claim 9, wherein the network entity comprises an OpenID Server Function, and the service provider comprises an OpenID Relying Party.

14. The wireless device of claim 9, wherein the identity assertion is configured to be validated at the network entity using the signature key.

15. The wireless device of claim 9, wherein the wireless device comprises a security module, and wherein the session key is generated using the security mode and stored on the security module.

16. The wireless device of claim 9, wherein the wireless device comprises a local web server, and wherein the authentication information is received via the local web server.

17. The wireless device of claim 9, wherein the association handle is received via a local DNS lookup performed by an application on the wireless device.

18. The wireless device of claim 9, wherein the session key is derived from a network authentication key associated with the network entity.

19. The wireless device of claim 9, the operations further comprising:
   communicating, via a local link, with another wireless device that has requested access to services from the service provider;
   receiving, via the local link, a request for authentication from the other wireless device; and
   sending the signed identity assertion to the other wireless device.

* * * * *